(12) United States Patent
Tokura

(10) Patent No.: US 9,091,493 B2
(45) Date of Patent: Jul. 28, 2015

(54) HOLDER FOR PIPE IN HEAT EXCHANGER, METHOD AND DEVICE FOR MANUFACTURING HEAT EXCHANGER USING SAID HOLDER, AND AIR CONDITIONER AND/OR OUTDOOR UNIT HAVING SAID HEAT EXCHANGER

(71) Applicant: KYOSHIN KOGYO CO., LTD., Osaka (JP)

(72) Inventor: Kenji Tokura, Osaka (JP)

(73) Assignee: KYOSHIN KOGYO CO., LTD., Osaka (JP)

( * ) Notice: Subject to any disclaimer, the term of this patent is extended or adjusted under 35 U.S.C. 154(b) by 0 days.

(21) Appl. No.: 14/318,331

(22) Filed: Jun. 27, 2014

(65) Prior Publication Data
US 2015/0084259 A1    Mar. 26, 2015

Related U.S. Application Data

(62) Division of application No. 13/522,237, filed as application No. PCT/JP2011/051374 on Jan. 14, 2011, now Pat. No. 9,015,943.

(30) Foreign Application Priority Data

| Jan. 15, 2010 | (JP) | ................................ 2010-022548 |
| Apr. 30, 2010 | (WO) | .................. PCT/JP2010/057987 |
| Jan. 12, 2011 | (JP) | ................................ 2011-018996 |

(51) Int. Cl.
| B23P 15/26 | (2006.01) |
| F28F 1/32 | (2006.01) |
| B21D 39/06 | (2006.01) |
| B21D 53/08 | (2006.01) |

(52) U.S. Cl.
CPC . *F28F 1/32* (2013.01); *B21D 39/06* (2013.01); *B21D 53/08* (2013.01); *B23P 15/26* (2013.01); *F28F 2275/125* (2013.01); *Y10T 29/4935* (2015.01); *Y10T 29/49375* (2015.01); *Y10T 29/53113* (2015.01)

(58) Field of Classification Search
CPC ................ B23P 15/26; Y10T 29/4935; Y10T 29/53113; Y10T 29/53117
See application file for complete search history.

(56) References Cited

U.S. PATENT DOCUMENTS

| 3,434,730 | A | * | 3/1969 | Smrekar | ...................... 279/4.09 |
| 4,867,463 | A | * | 9/1989 | Hopf | ............................ 279/46.7 |
| 5,806,173 | A | * | 9/1998 | Honma et al. | ................... 29/727 |
| 6,533,292 | B2 | * | 3/2003 | Fant | ................................ 279/43 |

FOREIGN PATENT DOCUMENTS

| EP | 1691159 A1 | 8/2006 |
| JP | 52-034839 A | 3/1977 |

(Continued)

*Primary Examiner* — David Bryant
*Assistant Examiner* — Ruth G Hidalgo-Hernande
(74) *Attorney, Agent, or Firm* — Konomi Takeshita

(57) ABSTRACT

The current invention provides a tube-grasping body for grasping an insert tube in a heat exchanger, and heat exchanger production methods and apparatuses utilizing the tube-grasping body, wherein the tube-grasping body enables to enlarge and connect an insert tube to a heat radiating fin for producing a heat exchanger, still keeping the total length of insert tubes at an almost same level even after the enlargement; and the tube-grasping body is connected at its exterior to the guide-pipe.

6 Claims, 12 Drawing Sheets

(56) References Cited

FOREIGN PATENT DOCUMENTS

| | | |
|---|---|---|
| JP | 63-188433 A | 8/1988 |
| JP | 06-230062 A | 8/1994 |
| JP | 07-003833 A | 1/1995 |
| JP | 07-020705 A | 1/1995 |
| JP | 09-099334 A | 4/1997 |
| JP | 10-085878 A | 4/1998 |
| JP | 2000-301271 A | 10/2000 |
| JP | 2009-099721 A | 5/2009 |

\* cited by examiner

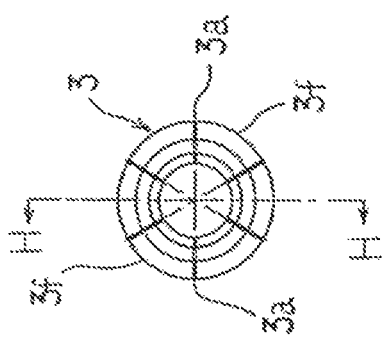
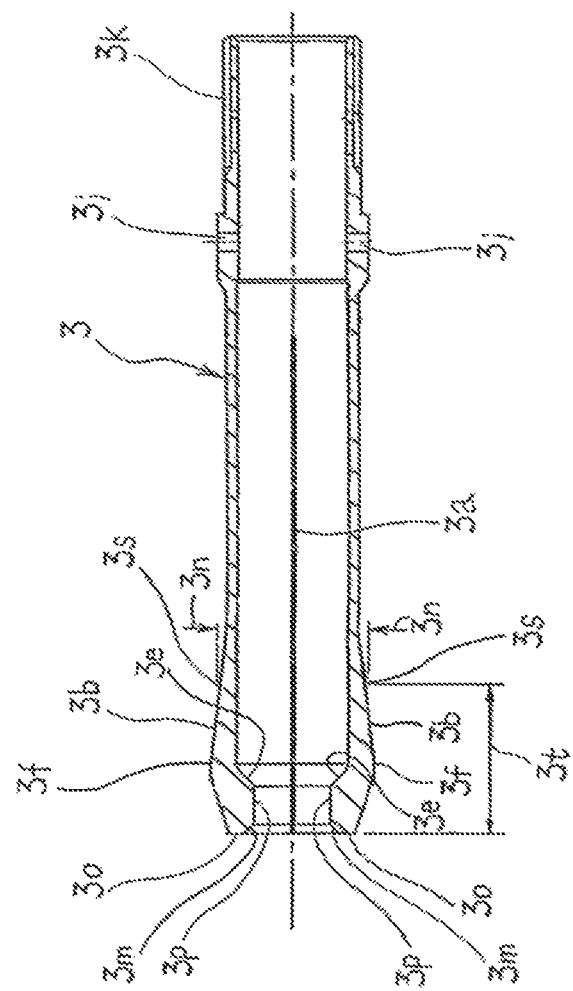

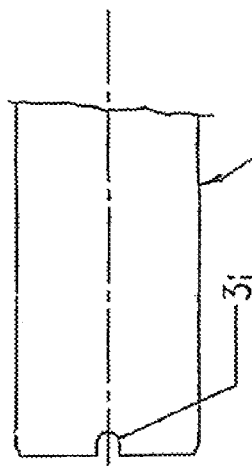
FIG.4A
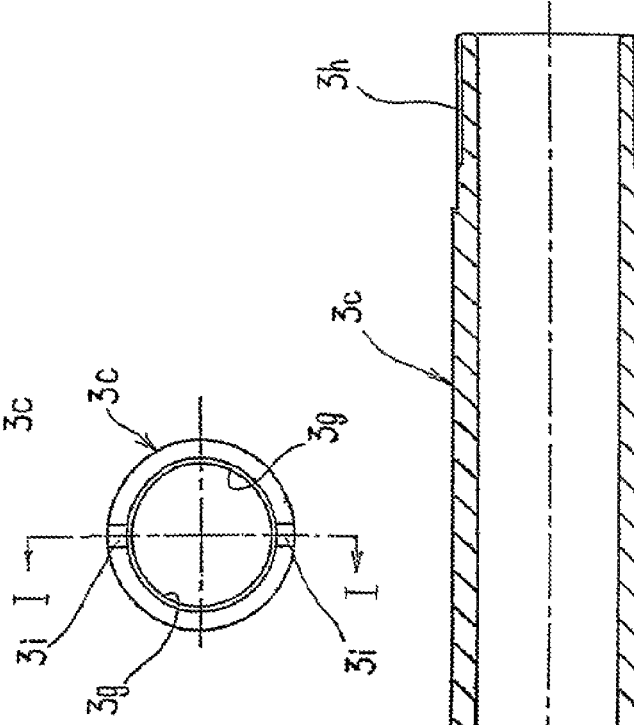
FIG.4B
FIG.4C

Pior Art

Pior Art

Pior Art

HOLDER FOR PIPE IN HEAT EXCHANGER, METHOD AND DEVICE FOR MANUFACTURING HEAT EXCHANGER USING SAID HOLDER, AND AIR CONDITIONER AND/OR OUTDOOR UNIT HAVING SAID HEAT EXCHANGER

FIELD OF THE INVENTION

The current invention relates to a tube-grasping body for grasping an insert tube in a heat exchanger, heat exchanger production methods and apparatuses utilizing the tube-grasping body, and an air conditioner and/or an outdoor unit equipped with the heat exchanger produced by the methods and apparatuses.

BACKGROUND OF THE INVENTION

Japanese patent No. 63-188433 (hereinafter referred to as 'the Invention A') and No. 10-85878 (applied by the applicant of the current patent application, and hereinafter referred to as 'the Invention B') are examples of the prior arts, which keep the entire length of insert tubes being enlarged, at an almost same level, even after the enlargement.

That is, as shown in FIG. 12(*a*), as a method of fixing a hairpin tube 7 at a heat radiating fin by inserting a tube-enlarging mandrel 2 into the opening 7*b* of said hairpin tube 7 in a heat exchanger 5, in a configuration where multiple hairpin tubes 7 are inserted into multiple heat radiating fins 6 which are overlaid and separated by a prescribed space isolation, 'the Invention A' provides a method wherein the hairpin part 7*c* of said hairpin tube 7 is fixed by a hook body 10 which is not movable toward said opening 7*b*; then the tube 7 is enlarged at the side of the opening 7*b*, rather than the side of the heat radiating fin 6, by inserting the tube-enlarging mandrel 2 from the opening 7*b* of the tube 7, and then the enlargement portion 7*d* is fixed in the through hole 9 of the clamp 8 which is not movable toward the said hairpin part 7*c*; then, the tube-enlarging mandrel 2 is inserted into the hairpin tube 7, in the state where the hairpin tube 7 is fixed by the clamp not to move toward the hairpin part 7 and the hairpin tube 7 is fixed by the hook body 10 not to move toward the opening 7*b*.

According to the method above, after the side of the opening 7*b* of the hairpin tube 7, rather than the side of the heat radiating fin 6, is fixed in the through hole 9 of the clamp 8 at the side of the opening 7*b* not to move toward the hairpin part 7*c*, the hairpin tube 7 tends to shrink during the enlargement process of inserting the tube-enlarging mandrel 2. However, since the hairpin part 7*c* is also fixed by the hook body 10, shrinkage of the hairpin tube 7 is prevented and absorbed by reducing the thickness in the hairpin tube 7. As a result, shrinkage in the entire length of tubes is kept at a minimum even after the enlargement.

However, the heat exchanger production method explained above has problems as detailed below.

That is, in the method above, as shown in FIG. 12(*b*), since the opening 7*b* of the hairpin tube 7 is fixed in the through hole 9 of the clamp 8, if hairpin tubes are inserted in a zigzag pattern in multiple columns such as columns of 3, 4, or etc., there exists a problem that hairpin tubes 7 sitting at the interior side in the heat exchanger cannot be fixed by the clamp 8.

On the other hand, as shown in (c) in the same figure, the problem above can be resolved, by mechanically varying the diameter of the through hole 9 of the clamp 8, by an aperture-like tool operating like an aperture in a camera. However, if the space between each of hairpin tubes 7 is fully taken up with complex components, or if said space is smaller than the gap between said aperture-like tools, there exists a space problem for setting up said aperture-like tools, and thus the limiting factor stated above still develops.

Also, if the diameter of the hairpin tube being enlarged in the heat exchanger 5 is changed according to the spec of the heat exchanger 5, the through holes 9 of the clamp 8 can no longer firmly fix the side of the opening 7*b* of the hairpin tube 7. Also, other various similar problems develop.

Thus, to resolve all of the problems stated above, the applicant of this application applied 'the Invention B' for the patent registration. According to 'the invention B', as shown in FIG. 1, in a heat exchanger production apparatus 1 configured with the main body 1*a* installed on the base platform 1*b*, 1*c* is the component-loading platform of the heat exchanger 5, which is vertically installed on said base platform 1*b*. Inside said heat exchanger 5, a plurality of hairpin tubes 7 with prescribed lengths are inserted in a row (not shown in the figure) into multiple heat radiating fins 6 along the surface of the component-loading platform 1*c*. Also, above said component-loading platform 1*c*, a pressing-plate 11 is installed to elevate in order to press and fix said heat exchanger 5 between the component-loading platform 1*c* and the pressing-plate 11.

2 represents the tube-enlarging mandrel which is installed for moving back and forth on said main body 1*a*, keeping its horizontal status. As shown in FIGS. 2(*a*) and (*b*), the tube-enlarging mandrel 2 is connected from its exterior to the tube-grasping body 3 to enable to move the tube-grasping body along the tube-enlarging mandrel 2. Said tube-grasping body 3 is equipped with a plurality of tube-contacting parts 3*f* on which the slopes 3*b* are formed and slanted in the widening direction, toward the side of the opening 7*b* of the corresponding tube 7, and which are capable of radially expanding or axially compressing (the arrow E) in the cross direction of the longitudinal length of said hairpin tube 7. Said slope 3*b* is formed to reach the end-line 3*o* of the tube-contacting part 3*f*. Said tube-grasping body 3 is screwed and connected to the tube-grasping body holder 3*l* by the bolt 3*k* formed at the other side, the opposite side of said tube-contacting parts 3*f*. Said tube-grasping body holder 3*l* is capable of moving back and forth (the arrow F) by a sliding means such as a cylinder (not shown in the figure), in the longitudinal direction of the hairpin tube 7, within a prescribed pitch. Also, the guide-pipe 3*c* is screwed and connected to the guide-pipe holder 3*d* by the bolt 3*h* formed at the other side. Said guide-pipe holder 3*d* is capable of moving back and forth (the arrow G) by a sliding means such as a cylinder (not shown in the figure).

Four of said tube-contacting parts 3*f* of the tube-grasping body 3 are formed in the longitudinal direction of said tube-enlarging mandrel 2 to enclose the exterior circumferential surface of said tube-enlarging mandrel 2 (for example, if 6 is proper for a specific exterior diameter of the tube, then 6 or other number is set). Also, between the tube-contacting parts 3*f*, slits, each of which has a uniform length and a uniform separation width of a prescribed width 3*u*, are formed at four places (the quantity of such slits does not have to be 4 and is properly determined in proportion to the count of tube-contacting parts 3*f*). Through said slits, the diameter of each of the tube-contacting parts 3*f* is decreased in the axial direction of the tube-enlarging mandrel 2, as the guide-pipe 3*c* is advanced, by the guide-pipe holder 3*d*, toward the heat exchanger, in order to press and slide along the slope 3*b* which has been formed on the exterior surface of each of said tube-contacting parts 3*f*, and which is slanted in the widening direction toward the opening 7*b* of the corresponding tube 7. It is structured by a so-called collet chuck. The tube-grasping bodies 3 in their multitudes (not shown in the figure) with said plural tube-contacting parts 3f are installed along the surface of said component-loading platform 1c, in order to be faced with each of the opening 7b of hairpin tubes 7 being inserted into the heat exchanger 5.

4 is an enclosing-body shifting device comprising: a pair of enclosing-bodies 4a which is installed on said base platform 1b, and which is supported to rotate to enclose the hairpin part 7c of the hairpin tube 7 being inserted into the heat radiating fin 6 of said heat exchanger 5; a driving-cylinder 4e to drive to open or close said enclosing-body 4a; a base plane 4d with said driving-cylinder 4e and a pair of enclosing-bodies 4a; a guide rail 12 to slide said base plane 4d, to or from said component-loading 1c; and a round-trip cylinder 4f which enables said base plane 4d to move back and forth. Multiple quantity (not shown in the figure) of said pair of enclosing-bodies 4a are installed along the plane of said component-loading platform 1c, to be faced with each of the hairpin part 7c of hairpin tubes 7 which are inserted into the heat radiating fin 6 of the heat exchanger 5.

Explanation is given below about production of a heat exchanger 5, wherein a heat exchanger production apparatus 1 utilizes the tube-grasping body 3 configured as above, and the tube-enlarging mandrel 2 is inserted into the hairpin tube 7. First, as shown in FIG. 1, the heat exchanger 5 is installed on said component-loading platform 1c, and, subsequently, said heat exchanger 5 is pressed and fixed between the component-loading platform 1c and the pressing-plate 11, by lowering the pressing-plate 11 located above.

Next, the base plane 4d is advanced (not shown in the figure) along the guide rail 12, by operating the round-trip cylinder 4f of the enclosing-body shifting device 4. At the same time, the driving-cylinder 4e is operated, in order to enclose the hairpin part 7c of each of hairpin tubes 7, as indicated in FIG. 11, by the tongue shaped concavity 4g which resembles a tongue when viewed from the plane of a pair of enclosing-bodies 4a. Corresponding to said tongue shaped concavity 4g, a tongue shaped convexity 4c, which resembles a tongue when viewed from said plane, is formed on the interior surface of said tongue shaped concavity 4g. Said tongue shaped convexity 4c turns around the U-shaped interior circumferential surface of said hairpin part 7c in order to firmly stop the shrinkage of the hairpin tube 7 during the enlarging process.

Next, from the opening 7b of each of said hairpin tubes 7, as shown in FIG. 2(c), by inserting (the arrow A) each of the tube-enlarging mandrels 2 by a prescribed depth, the enlargement portion 7d with a prescribed length is formed. Subsequently, by advancing (the arrow B) the tube-grasping body 3, by the tube-grasping body holder 3l, from the opening 7b of the hairpin tube 7, toward the circumferential surface 7e of said enlargement portion 7d, the tube-grasping body 3 becomes connected to the exterior of said circumferential surface 7e, in the state where said circumferential surface 7e is surrounded by the tube-contacting parts 3f.

Afterwards, if the guide-pipe 3c is moved (the arrow C), by the guide-pipe holder 3d, in the same direction of the movement of the tube-enlarging mandrel 2, the guide-pipe 3c presses the slope 3b while sliding along the same slope which has been formed on the exterior surface of each of said tube-contacting parts 3f, and which is slanted in the widening direction toward the opening 7b of the corresponding tube 7. Thus, the diameter of the tube-contacting parts 3f is reduced in the axial direction of the tube-enlarging mandrel 2, through the space isolation of the prescribed width 3u of the slits 3a. As a result, each of said tube-contacting parts 3f becomes to firmly grasp and support the circumferential surface 7e of the enlargement portion 7d of the hairpin tube 7.

Next, from this state, by moving said tube-enlarging mandrel 2 toward the hairpin part 7c of the hairpin tube 7, in order to support both of the hairpin part 7c and the opening 7b of the hairpin tube 7, it is possible to produce a heat exchanger, still keeping shrinkage of the entire length of hairpin tubes 7 at a minimum.

Also, when the tube-enlarging mandrel 2 is advanced toward the hairpin part 7c of the hairpin tube 7 while the circumferential surface 7e of the enlargement portion 7d is firmly grasped, as explained above, by plural tube-contacting parts 3f of the tube-grasping body 3, at the side of the opening 7b of the hairpin tube 7; the enclosing-body shifting device 4, equipped with the enclosing-bodies 4a capable of enclosing said hairpin part 7c, is moved back little (not shown in the figure) in the same direction of the movement of the tube-enlarging mandrel 2, in order to give some tensile strength for the entire hairpin tube 7. Thus, It is possible to produce a heat exchanger, keeping the shrinkage of the entire length of the hairpin tube 7 at a minimum, and considering the problem of shrinking of the entire length of the hairpin tube 7 during the enlarging process, as well as the problem of escaping of the hairpin tube 7 from the tube-contacting parts 3f and the enclosing-body 4a. As a result, it is possible to produce a heat exchanger, still keeping the material cost at a minimum.

Thus, it is possible to firmly grasp, by each of the tube-grasping bodies 3 having plural tube-contacting parts 3f, each of hairpin tubes 7 sitting at the interior side in the heat exchanger, as well as each of the tubes sitting at the exterior side in the heat exchanger, even for the following example cases: the case where hairpin tubes 7 are inserted into the heat radiating fin 6 of a heat exchanger 5 in a zigzag pattern (not shown in the figure); and the case where hairpin tubes 7 are inserted in a zigzag pattern, in multiple columns such as columns of 3, 4, or etc. (not shown in the figure) to decrease the gap (the insert pitch) between each of hairpin tubes 7.

Thus, since the tube-contacting parts 3f of said tube-grasping body 3 grasp the circumferential surface 7e of the enlargement portion 7d of the hairpin tube 7, by decreasing the diameter of the tube-contacting parts 3f in the axial direction, through the slits which are of a prescribed width 3u, and which are formed between each of the tube-contacting parts 3f, even for the case where the diameter of the hairpin tube 7 being enlarged is different according to the spec of the heat exchanger; it is possible to firmly and surely grasp the side of the opening 7b of the hairpin tube 7, by adjusting through the space distance of the slits 3a of a prescribed width 3u, between each of the tube-contacting parts 3f, even if there is little difference in each of diameters of the tubes. Also, as for the hairpin part 7c, since there is no need to replace the hook body 10 with another hook body having an almost identical circular arc to the interior circumference of the hairpin part 7c, in order to adapt to the different hairpin part 7c of hairpin tubes 7 with different diameters; and since it is possible to firmly and surely grasp by a pair of enclosing-bodies 4a, without altering the circular arc of the hairpin part 7c of the hairpin tube 7; it is possible to produce a heat exchanger, performing the enlarging process desired, without altering the heat exchanger production apparatus, even for the following cases: the case where the exterior diameter (the diameter of the tube, measured considering the circular arc) of the hairpin tube 7 being enlarged is different according to the spec of the heat exchanger 5, and the case where the entire length of hairpin tubes 7 is somewhat different.

Also, relating to the case where the hairpin part 7c of the hairpin tube 7 is firmly and surely enclosed by a pair of enclosing-bodies 4a as shown above, it is possible to exchange a pair of enclosing-bodies 4a to other type with a proper opening size, width, and length, according to the gap between insert tubes facing each other and the distance extruded from the terminal side of the heat radiating fin 6 of the hairpin part 7c of the hairpin 7; even for any of the following example cases:

the case where hairpin tubes 7 are inserted into a heat radiating fin 6 of a heat exchanger 5 in the same zigzag pattern (not shown in the figure) as above, and the case where hairpin tubes 7 are inserted in a zigzag pattern, in multiple columns (not shown in the figure) such as columns of 3, 4, or etc. to decrease the gap between each of hairpin tubes (the insert pitch).

However, unlike the hook body 10 of the prior art, since the hairpin part is enclosed by a pair of enclosing-bodies 4a, there exists some permissible range and it is thus possible to avoid frequent change of the hook body 10. However, the most important point is the fact that it is possible to firmly fix the hairpin part 7c of each of the hairpin tubes 7 sitting at the interior side in the heat exchanger, as well as the hairpin part 7c of each of the hairpin tubes sitting at the exterior side in the heat exchanger, by allocating a pair of enclosing bodies 4a to each of the hairpin parts 7c.

Also, even if insert tubes 7 of other types than the hairpin tube are inserted, for example, if multiple straight tubes (not shown in the figure) are inserted, it is possible to produce a high quality heat exchanger with high precision, by enclosing and supporting, by a pair of the enclosing-bodies 4a, an end of the straight tube extruding from the terminal side of the heat radiating fin 6, and by inserting the tube-enlarging mandrel 2 into the opening 7b of the other end of the straight tube, by the same procedure as shown above.

Therefore, even for the case where insert tubes are inserted into a heat radiating fin, in multiple columns such as columns of 3, 4, or etc. to decrease the gap between insert tubes, and the case where the diameter of insert tubes being enlarged is different according to the spec of the heat exchanger, it is possible to firmly grasp and perform the enlarging process for insert tubes sitting at the interior side in the heat exchanger, as well as the tubes sitting at the exterior side in the heat exchanger. As a result, it is possible to produce a high quality heat exchanger, still keeping the material cost at a minimum by maintaining shrinkage of total length of insert tubes at a minimum.

Also, as shown in FIG. 2(d), if a bump 3e is formed at each of the tube-contacting parts 3f for pressing (the arrow D) the circumferential surface 7e of said enlargement portion 7d, at the position where each of the tube-contacting parts meets the enlargement portion 7d of the hairpin tube 7, in order to build up the extruded-part 7g extruding from the interior circumferential surface 7f of said hairpin 7, in the axial direction of the tube-enlarging mandrel 2; it is possible to surely set the reference location of the opening 7b during the enlargement process, and therefore, it is possible to produce a high precision heat exchanger by the enlarging process with higher precision.

On the other hand, the method, which is very similar to the Japanese Patent 10-85878, and which still considers the situation explained in FIG. 2(d) above, is Japanese Patent 9-99334 (hereinafter referred to as 'Patent Document 3') wherein a slope is formed in front of the bump which is formed at each of the tube-contacting parts, in order to prevent said opening from being deformed by a collision with the opening; a slope is formed in front of the guide pipe, for reducing the sliding abrasion against the slope on the exterior surface of each of said tube-contacting parts; a bolt is formed on the exterior circumferential surface of the tube-contacting part, a nut is formed on the interior circumferential surface of the guide-pipe, and said guide-pipe is screwed by said bolt and nut and installed for moving said guide-pipe back and forth.

SUMMARY OF THE INVENTION

The current invention resolves the problems explained below.

That is, according to the heat exchanger production apparatus 1 configured as above, since the tube-enlarging mandrel 2 is connected from its exterior to the tube-grasping body 3 to enable to move the tube-grasping body along the tube-enlarging mandrel 2;

said tube-grasping body 3 is equipped with a plurality of tube-contacting parts 3f on which the slopes 3b are formed and slanted in the widening direction, toward the side of the opening 7b of the corresponding tube 7, and which are capable of radially expanding or axially compressing (the arrow E) in the cross direction of the longitudinal length of said hairpin tube 7;

said slope 3b is formed to reach the end-line 3o of the tube-contacting part 3f;

said tube-grasping body 3 is screwed and connected to the tube-grasping body holder 3l by the bolt 3k formed at the other side, the opposite side of said tube-contacting parts 3f. Said tube-grasping body holder 3l is capable of moving back and forth (the arrow F) by a sliding means such as a cylinder (not shown in the figure), in the longitudinal direction of the hairpin tube 7, within a prescribed pitch; and the guide-pipe 3c is also screwed and connected to the guide-pipe holder 3d by the bolt 3h formed at the other side. Said guide-pipe holder 3d is capable of moving back and forth (the arrow G) by a sliding means such as a cylinder (not shown in the figure);

by sliding said guide-pipe 3c toward the opening 7b of the tube 7 along the slopes 3b of the tube-contacting parts 3f, the diameter of the tube-contacting parts 3f is reduced in the axial direction. At the same time, the bump 3e, which is formed at the side of the opening 7b on the interior surface of each of the tube-contacting parts 3f, presses the circumferential surface 7e of the enlargement portion 7d of the hairpin tube 7, in order to form an extruded-part 7g extruding in the axial direction of the tube 7. Thus, the tube-contacting parts become to firmly grasp and support the tube, and, therefore, it is possible to accurately set the reference point of the opening 7b, during the enlarging process, such that producing a high precision heat exchanger is possible by the higher precision enlarging process. However, since, in the tube-grasping body 3 configured as above, the slope 3b of each of the tube-contacting parts 3f is formed to reach the end-line 3o of each of the tube-contacting parts 3f, it is necessary to advance said guide-pipe 3c, while sliding along the slopes 3b, to the position where the end-line of the guide-pipe 3c contacts the end-line 3o of the tube-contacting part 3f.

Recently, there exists a trend of downsizing, not only the heat exchanger 5 itself (tubes being downsized and etc.), but also straight tubes or hairpin tubes 7 being inserted into the heat radiating fin 6 of said heat exchanger 5, due to the problems of saving in energy and cost. Therefore, it is needed to have a heat exchanger 5 with a smaller gap between each of tubes 7 than the prior arts, for the following example cases: the case where straight tubes or hairpin tubes 7 are inserted in a row (not shown in the figure) into the heat radiating fin 6 of the heat exchanger 5, the case where tubes 7 are inserted in a zigzag pattern (not shown in the figure), and the case where tubes 7 are inserted in multiple columns such as columns of 3, 4, or etc (not shown in the figure).

On the other hand, according to the heat exchanger production apparatus 1 configured as above, even if the diameter of the hairpin tube 7 of the heat exchanger 5 being enlarged is different according to the spec of the heat exchanger 5, since the circumferential surface 7e of the enlargement portion 7d of the hairpin tube 7 is grasped by each of the tube-contacting parts 3f of the tube-grasping body 3, by adjusting, within some range, the space distance of a prescribed width 3u of each of the slits 3a which are formed between each of the tube-contacting parts; it is possible to firmly and surely grasp the side of the opening 7b of the hairpin tube 7, by automatically adapting to the difference in tube diameter through the slits between each of the tube-contacting parts 3f. However, unfortunately, according to the tube-grasping body 3 of the prior art, since the slope 3b of each of the tube-contacting parts 3f is formed to reach the end-line 3o of each of the tube-contacting parts 3f, it is necessary to advance the end-line of the guide-pipe 3c to the end-line 3o of the tube-contacting part 3f, during shrinking of the diameter of the tube-contacting parts 3f of the tube-grasping body 3. Thus, if both of exterior diameters of the tube-contacting parts 3f and the tube-grasping body 3 are minimized, the exterior diameter of the guide-pipe 3c being connected at the exterior of the tube-grasping body 3 is automatically determined as the reference diameter (the interior diameter itself when viewed from the guide-pipe 3c), the exterior diameter measured between summits of the opposing slopes 3b which are faced each other, and which are formed to reach the end-line 3o of the corresponding tube-contacting parts whose diameter is being decreased during the enlargement. Thus, there is a problem in the exterior diameter of each of the guide-pipes 3c, in order to allocate to each of straight tubes or hairpin tubes 7, when the gap between the tubes is significantly reduced. As a result, due the problem of contacting neighboring guide-pipes 3c, there exists a problem of developing a limit in the gap (pitch) between each of the tube-grasping bodies 3, in allocating each of straight tubes or hairpin tubes 7 to a tube-grasping body 3 which is connected at its exterior to guide-pipe 3c.

Also, according to PATENT DOCUMENT 3 of the prior arts, a bolt is formed on the exterior circumferential surface of the tube-contacting part, and a nut is formed on the interior circumferential surface of the guide-pipe, in order to join them together and move said guide-pipe back and forth. However, if the gap between each of straight tubes or hairpin tubes 7 being inserted into said heat radiating fin 6 is significantly reduced comparing to the prior arts, there exists the same problem as above, such a problem as a limit in the gap between each of the tube-grasping bodies 3, due to the problems such as the height of the threads of the bolt and nut or the gap (pitch) between screws. Thus, to resolve problems such as the cost and the configuration for any of cases above, it is requested the development of a tube-grasping body 3 or a heat exchanger production apparatus utilizing said tube-grasping body 3, wherein said tube-grasping body 3 is simply configured to slide back and forth, toward the opening 7b, in order to radially expand or axially compress said tube-contacting parts 3f of the tube-grasping body 3; and said tube-grasping body 3 is able to significantly reduce the gap (pitch), still avoiding the contact with neighboring guide-pipes 3c, even when the gap between each of straight tubes or hairpin tubes 7 being inserted into the heat radiating fin 6 is significantly reduced.

Also, not limiting to the case where the gap between each of straight tubes or hairpin tubes 7 being inserted into the heat radiating fin 6 is significantly reduced comparing to the prior arts, for example, if the exterior diameter of the enlargement portion of the tube is smaller than the interior diameter of the tube-grasping body 3 or the interior diameter between tube-contacting parts 3f of said tube-grasping body 3, it is possible for the tube-grasping body 3 or the tube-contacting parts 3f to grasp the exterior circumferential surface 7e of the enlargement portion 7d of each of straight tubes or hairpin tubes 7. However, if the exterior diameter of the enlargement portion 7d of the tube 7 is about the same size as the interior diameter of the tube-grasping body 3 or the interior diameter between the tube-contacting parts 3f of said tube-grasping body 3 (the interior diameter between the bumps 3e if bumps 3e are formed), or if the axis of said enlargement portion 7d is away, by some degree, relative to the longitudinal direction of the tube-enlarging mandrel 2, from the axis of the tube-grasping body 3, there develops a case where the end-line 3o of each of the tube-contacting parts 3f contacts the opening 7b of the tube such that at least one of them is damaged. Thus, an improvement is required.

The current invention provides a tube-grasping body for grasping an insert tube in a heat exchanger, heat exchanger production methods and apparatuses utilizing the tube-grasping body, and an air conditioner and/or an outdoor unit equipped with the heat exchanger produced by the methods and apparatuses; in order to produce a heat exchanger wherein the total length of the insert tubes is kept at an almost same level even after the enlargement, still satisfying the following requirements:

preventing one end from being transformed or deformed by collision of the end-line of the tube-contacting parts of the tube-grasping body, with the opening of the tube where the enlargement portion is formed;

preventing a contact with neighboring guide-pipes, when allocating a tube-grasping body being connected at its exterior to the guide-pipe, to each of straight tubes or hairpin tubes; and firmly supporting the enlargement portion of each of the tubes sitting at the interior side in the heat exchanger, as well as that of each of the tubes sitting at the exterior side in the heat exchanger, in the following heat exchangers:

a downsized heat exchanger where the gap (pitch) between each of the tube-grasping bodies is minimized, and a heat exchanger where the gap between each of the tubes is significantly reduced;

to resolve all the problems occurring in the following example cases:

the case where the gap between straight tubes or hairpin tubes is decreased, due to downsized insert tubes due to savings in energy or cost (use of downsized tubes or downsized heat exchanger itself);

the case where the gap between insert tubes is decreased due to insertion of straight tubes or hairpin tubes into a heat radiating fin in a zigzag pattern;

the case where the gap between insert tubes is decreased to enable them to be inserted into a heat radiating fin in multiple columns such as columns of 3, 4, or etc.;

the case where the diameters of insert tubes being enlarged are different according to the spec of the heat exchanger;

the case where the gap between each of straight tubes or hairpin tubes being inserted into said heat radiating fin is significantly decreased comparing to the prior arts;

the case where the exterior diameter of the enlargement portion of the insert tube becomes about the same size as the interior diameter of the tube-grasping body itself or the interior diameter between the tube-contacting parts (the interior diameter between the bumps if bumps are formed on the interior surface of the tube-contacting parts); and the case where the axis of said enlargement portion is away, by some degree, relative to the direction of the longitudinal length of the tube-enlarging mandrel, from the axis of the tube-grasping body.

The present invention provides the ways to resolve the problems explained above. That is, the invention in claim 1 is to provide a tube-grasping body for grasping an insert tube in a heat exchanger, which is used in a heat exchanger production apparatus 1;

which is also connectable at the exterior of a tube-enlarging mandrel 2, for moving back and forth, along said tube-enlarging mandrel 2 which is penetrable from the opening 7b of a tube 7 inserted into a heat radiating fin 6 of a heat exchanger 5;

which is also equipped with a plurality of tube-contacting parts 3f, capable of radially expanding or axially compressing in the cross direction of the longitudinal length of said tube 7;

which is also equipped with slopes 3b slanting gradually in the widening direction toward the opening 7b of the corresponding tube, wherein each of the slopes 3b is formed on the exterior surface of each of said tube-contacting parts 3f;

which also radially expands or axially compresses each of said tube-contacting parts 3f, by a sliding means which moves back and forth in the longitudinal direction of the tube, along said slopes 3b of the tube-contacting parts 3f; and which is also characterized by the configuration wherein said tube-contacting parts 3f, capable of radially expanding or axially compressing, are formed and separated by a plurality of slits 3a which are of prescribed widths 3u, and which are formed in the longitudinal direction of the tube-grasping body 3, the same direction of the movement of the tube-enlarging mandrel 2; and the width of each of said slits 3a is gradually increased from said prescribed width 3u to an expanded width 3x, from a prescribed location toward the opening 7b of said tube 7.

The invention in claim 2 is to provide the tube-grasping body for grasping an insert tube in a heat exchanger, wherein a sliding means is provided by the guide-pipe 3c, which moves back and forth in the longitudinal direction of the tube, along said slopes 3b of the tube-contacting parts 3f; and the maximum exterior diameter 3v of said tube-grasping body 3 is set below the exterior diameter 3w of the guide-pipe 3c, wherein the maximum exterior diameter 3v is formed and configured by the opposing tube-contacting parts 3f facing each other in order to build up said slopes 3b.

The invention in claim 3 is to provide the tube-grasping body for grasping an insert tube in a heat exchanger, wherein each of said tube-contacting parts 3f, capable of radially expanding or axially compressing, is bent to form a smooth curve with or without a edge on the bent portion, in the radial direction, from a prescribed location of each of said slits 3a toward the opening 7b of the tube 7, in order to gradually expand the width of each of said slits 3a from the prescribed width 3u to the expanded width 3x, from a prescribed location, toward the opening 7b of the tube 7.

The invention in claim 4 is to provide the tube-grasping body for grasping an insert tube in a heat exchanger, wherein a bump 3e is formed to extrude from the interior surface of each of said tube-contacting parts 3f, at the side of the opening 7b, in the axial direction of the tube 7; and a slope 3m, which has a straight or curved sloping side, is formed at said bump 3e, and slanted in the widening direction, from the summit 3p of the bump 3e, toward the opening 7b of the tube 7 facing the end-line 3o of the tube-contacting part 3f, in order to prevent said opening 7b from being deformed by collision of the bump 3e with the opening 7b of the tube 7 when the opening 7b of the tube 7 is connected at its exterior to the tube-contacting parts 3f.

The invention in claim 5 is to provide the tube-grasping body for grasping an insert tube in a heat exchanger, wherein a limiting means is installed at said tube-grasping body 3 having tube-contacting parts 3f when said tube-grasping body 3 is held by the tube-grasping body holder 3l, in order to limit the location of the radial expansion or the axial compression of the tube-contacting parts 3f of the tube-grasping body 3 (limiting rotation of the tube-grasping body holder 3l).

The invention in claim 6 is to provide the tube-grasping body for grasping an insert tube in a heat exchanger, wherein a slope 3g, which has a straight or curved sloping side, is formed on the interior circumference of said guide-pipe 3c at its end side, and slanted in the widening direction toward the opening 7b of the corresponding tube 7, in order to reduce the sliding abrasion against each of the slopes 3b formed on the exterior surface of each of said tube-contacting parts 3f; and said slope 3b is also formed, on the exterior surface of each of the tube-contacting parts 3f of said tube-grasping body 3, at such a position that the slope 3b is not allowed to reach the end-line 3o of each of said tube-contacting parts 3f.

The invention in claim 7 is to provide a heat exchanger production method, utilizing a tube-grasping body for grasping an insert tube in a heat exchanger, the method comprising:

the first process wherein an enlargement portion having a prescribed length is formed, by inserting a tube-enlarging mandrel by a prescribed depth, from the opening of an insert tube being inserted into a heat radiating fin of a heat exchanger;

the second process wherein the exterior of said enlargement portion is surrounded and connected, by the tube-grasping body wherein said tube-contacting parts, capable of radially expanding or axially compressing, are formed and separated by a plurality of slits which are of prescribed widths, and which are formed in the longitudinal direction of the tube-grasping body, the same direction of the movement of the tube-enlarging mandrel; and the width of each of said slits is gradually increased from said prescribed width to an expanded width, from a prescribed location toward the opening of said tube;

the third process wherein the circumferential surface of the enlargement portion of the tube is firmly grasped and supported by tube-contacting parts, as the diameter of each of the tube-contacting parts is reduced in the axial direction to gradually reduce the expanded width which has been expanded from a prescribed width from a prescribed position of the slit, by a sliding means pressing the slopes of the tube-contacting parts, while sliding, toward the opening of the corresponding tube, along the same slopes which are slanted in the widening direction toward the opening of the tube; and the forth process wherein, in the state where the circumferential surface of the enlargement portion of the tube is firmly grasped and supported by the tube-contacting parts, the tube-enlarging mandrel is further inserted into the tube to join the heat radiating fin and the tube together.

The invention in claim 8 is to provide a heat exchanger production method, utilizing said tube-grasping body for grasping an insert tube in a heat exchanger, wherein a bump is formed to extrude from the interior surface of each of said tube-contacting parts, at the side of the opening, in the axial direction of the tube; and each of said tube-contacting parts, capable of radially expanding or axially compressing, is bent to form a smooth curve with or without a edge on the bent portion, in the radial direction, from a prescribed location of said slit toward the opening of the tube, in order to gradually expand the width of each of said slits from the prescribed width to the expanded width, from a prescribed location, toward the opening of the tube.

The invention in claim 9 is to provide a heat exchanger production method, utilizing said tube-grasping body for grasping an insert tube in a heat exchanger, wherein a limiting means is installed at said tube-grasping body 3 having tube-contacting parts 3f when said tube-grasping body 3 is held by the tube-grasping body holder 3l, in order to limit the location of the radial expansion or the axial compression of the tube-contacting parts 3f of the tube-grasping body 3.

The invention in claim 10 is to provide a heat exchanger production method, utilizing said tube-grasping body for grasping an insert tube in a heat exchanger, wherein a sliding means is provided by the guide-pipe 3c, which moves back and forth in the longitudinal direction of the tube, along said slopes 3b of the tube-contacting parts 3f; and the maximum exterior diameter 3v of said tube-grasping body 3 is set below the exterior diameter 3w of the guide-pipe 3c, wherein the maximum exterior diameter 3v is formed and configured by the opposing tube-contacting parts 3f facing each other in order to build up said slopes 3b.

The invention in claim 11 is to provide an air-conditioner which is equipped with a heat exchanger produced by a production method, utilizing said tube-grasping body for grasping an insert tube in a heat exchanger.

The invention in claim 12 is to provide an outdoor unit which is used with an air conditioner, and which is equipped with a heat exchanger produced by a production method, utilizing said tube-grasping body for grasping an insert tube in a heat exchanger.

The invention in claim 13 is to provide a heat exchanger production apparatus wherein the tube-grasping body is used in a heat exchanger production apparatus 1;

the tube-grasping body is also connectable at the exterior of a tube-enlarging mandrel 2, for moving back and forth, along said tube-enlarging mandrel 2 which is penetrable from the opening 7b of a tube 7 inserted into a heat radiating fin 6 of a heat exchanger 5;

the tube-grasping body is also equipped with a plurality of tube-contacting parts 3f, capable of radially expanding or axially compressing in the cross direction of the longitudinal length of said tube 7;

the tube-grasping body is also equipped with slopes 3b slanting gradually in the widening direction toward the opening 7b of the corresponding tube, wherein each of the slopes 3b is formed on the exterior surface of each of said tube-contacting parts 3f;

the tube-grasping body is also equipped with a sliding means which radially expands or axially compresses each of said tube-contacting parts 3f, by sliding back and forth in the longitudinal direction of the tube, along said slopes 3b of the tube-contacting parts 3f;

a bump 3e is formed to extrude from the interior surface of each of said tube-contacting parts 3f, at the side of the opening 7b, in the axial direction of the tube 7;

a slope 3m, which has a straight or curved sloping side, is formed at said bump 3e, and slanted in the widening direction, from the summit 3p of the bump 3e, toward the opening 7b of the tube 7 facing the end-line 3o of the tube-contacting part 3f, in order to prevent said opening 7b from being deformed by collision of the bump 3e with the opening 7b of the tube 7 when the opening 7b of the tube 7 is connected at its exterior to the tube-contacting parts 3f;

a slope 3g, which has a straight or curved sloping side, is formed on the interior circumference of said guide-pipe 3c at its end side, and slanted in the widening direction toward the opening 7b of the corresponding tube 7, in order to reduce the sliding abrasion against each of the slopes 3b formed on the exterior surface of each of said tube-contacting parts 3f;

said slope 3b is also formed, on the exterior surface of each of the tube-contacting parts 3f of said tube-grasping body 3, at such a position that the slope 3b is not allowed to reach the end-line 3o of each of said tube-contacting parts 3f; and the tube-grasping body 3 is also characterized by the configuration wherein said tube-contacting parts 3f, capable of radially expanding or axially compressing, are formed and separated by a plurality of slits 3a which are of prescribed widths 3u, and which are formed in the longitudinal direction of the tube-grasping body 3, the same direction of the movement of the tube-enlarging mandrel 2; and the width of each of said slits 3a is gradually increased from said prescribed width 3u to an expanded width 3x, from a prescribed location toward the opening 7b of said tube 7.

The invention in claim 14 is to provide a heat exchanger production apparatus 1, utilizing said tube-grasping body 3, wherein, the slope 3b is formed on the exterior surface of each of said tube-contacting parts 3f of said tube-grasping body 3, at the rear side of the bump 3e which is formed at the side of the opening 7b on the interior surface of each of said tube-contacting parts 3f, the opposite side of the end-line 3o of the tube-contacting part 3f, in such a way that said slope 3b is not allowed to reach the end-line 3o of each of the tube-contacting parts 3f of said tube-grasping body 3.

The invention in claim 15 is to provide a heat exchanger production apparatus 1, utilizing said tube-grasping body 3, wherein
> said tube-grasping body 3 is equipped with a tool-joining part 3*j* for joining or disjoining said tube-grasping body 3, to or from the tube-grasping body holder 3*l*.

The invention in claim 16 is to provide a heat exchanger production apparatus 1, utilizing said tube-grasping body 3, wherein
> a limiting means is installed at said tube-grasping body with tube-contacting parts 3*f* when said tube-grasping body 3 is held by the tube-grasping body holder 3*l*, in order to limit the location of the radial expansion or the axial compression of the tube-contacting parts 3*f* of the tube-grasping body 3 (limiting rotation of the tube-grasping body holder 3*l*).

The invention in claim 17 is to provide a heat exchanger production apparatus 1, utilizing said tube-grasping body 3, wherein
> said sliding means is provided by the guide-pipe 3*c*, and
> said guide-pipe 3*c* is equipped with a tool-joining part 3*i* for joining or disjoining the guide-pipe 3*c*, to or from the guide-pipe holder 3*d*.

According to the current invention, as the tube-grasping body for grasping an insert tube in a heat exchanger,
which is used in a heat exchanger production apparatus 1;
which is also connectable at the exterior of a tube-enlarging mandrel 2, for moving back and forth, along said tube-enlarging mandrel 2 which is penetrable from the opening 7*b* of a tube 7 inserted into a heat radiating fin 6 of a heat exchanger 5;
which is also equipped with a plurality of tube-contacting parts 3*f*, capable of radially expanding or axially compressing in the cross direction of the longitudinal length of said tube 7;
which is also equipped with slopes 3*b* slanting gradually in the widening direction toward the opening 7*b* of the corresponding tube, wherein each of the slopes 3*b* is formed on the exterior surface of each of said tube-contacting parts 3*f*; and
which also radially expands or axially compresses each of said tube-contacting parts 3*f*, by a sliding means which moves back and forth in the longitudinal direction of the tube, along said slopes 3*b* of the tube-contacting parts 3*f*;
since
> said tube-contacting parts 3*f*, capable of radially expanding or axially compressing, are formed and separated by a plurality of slits 3*a* which are of prescribed widths 3*u*, and which are formed in the longitudinal direction of the tube-grasping body 3, the same direction of the movement of the tube-enlarging mandrel 2; and
> the width of each of said slits 3*a* is gradually increased from said prescribed width 3*u* to an expanded width 3*x*, from a prescribed location toward the opening 7*b* of said tube 7;

when the side of the opening 7*b* of the tube 7 is being connected at its exterior to the tube-contacting parts 3*f*, it is possible to expand the maximum open diameter 3*y* and the dynamic range of each of the tube-contacting parts 3*f*, (said dynamic range is measured from the difference in diameters between the expansion and the compression states), through the plural slits 3*a* which are separated by a prescribed width 3*u*, and which are formed in the longitudinal direction of the tube-grasping body 3 to set up said tube-contacting parts 3*f*. Therefore, even if the exterior diameter 7*i* of the enlargement portion 7*d* at the side of the opening 7*b* of the tube 7 becomes about the same size as the interior diameter of the tube-grasping body 3 itself or the interior diameter between the tube-contacting parts 3*f* (the interior diameter between the bumps, if bumps are formed), or, even if the axis of the enlargement portion 7*d* is away, by a small degree, relative to the longitudinal direction of the tube-enlarging mandrel, from the axis of the tube-grasping body 3, it is possible, by each of the tube-contacting parts 3*f* whose maximum open diameter 3*y* and the dynamic range have been expanded, to provide the effect of surely preventing one end from being deformed or transformed by a collision of the end-line of the tube-contacting part 3*f* and the opening 7*b* of the tube 7.

Also, according to the tube-grasping body 3 of the current invention, since
> a sliding means is provided by the guide-pipe 3*c*, which moves back and forth in the longitudinal direction of the tube, along said slopes 3*b* of the tube-contacting parts 3*f*; and
> the maximum exterior diameter 3*v* of said tube-grasping body 3 is set below the exterior diameter 3*w* of the guide-pipe 3*c*, wherein the maximum exterior diameter 3*v* is formed and configured by the opposing tube-contacting parts 3*f* facing each other in order to build up said slopes 3*b*, it is possible to accommodate said tube-contacting parts 3*f*, which are formed and separated by the slits 3*a* with a prescribed width 3*u*, within the exterior diameter 3*w* of the guide-pipe 3*c*, in the state where the maximum open diameter 3*y* and the dynamic range (the dynamic range is the difference of the diameters between the expansion and compression states) of each of the tube-contacting parts 3*f* have been expanded through expansion of each of the widths of the slits 3*a* to a larger value than a prescribed width 3*u*. Therefore, it is possible to provide the effect of surely preventing a collision by neighboring tube-contacting parts 3*f*, even for the following cases:
> the case where the space between each of the guide-pipes 3*c* is fully taken up, corresponding to the case where the gap between branches of the hairpin tube 7, or the gap between each of neighboring hairpin tubes 7, or the gap between each of straight tubes being inserted, is significantly reduced comparing to the prior arts, and
> the case where the enlargement portion 7*d* at the side of the opening 7*b* of the tube 7 is being grasped, by each of the tube-contacting parts 3*f* of each of the tube-grasping bodies 3, which is accommodated in the interior of each of the neighboring guide-pipes 3*c*.

Also, according to the tube-grasping body 3 of the current invention, since
> each of said tube-contacting parts 3*f*, capable of radially expanding or axially compressing, is bent to form a smooth curve with or without a edge on the bent portion, in the radial direction, from a prescribed location of each of said slits 3*a* toward the opening 7*b* of the tube 7, in order to gradually expand the width of each of said slits 3*a* from the prescribed width 3*u* to the expanded width 3*x*, from a prescribed location, toward the opening 7*b* of the tube 7, it is possible to increase durability as a component, by smoothly sliding the guide-pipe 3*c* along the slope 3*b* which is formed on each of the tube-contacting parts 3*f* with or without a edge on its sloping side, even if the maximum open diameter 3*y* and the dynamic range of each of the tube-contacting parts 3*f* (said dynamic range is the difference in diameters between the expansion and the compression states of each of the tube-contacting parts 3*f*) are expanded, through the space distance of the expanded widths 3*x*, the width expanded from the prescribed width 3*u* of the slit 3*a*. Also, it is possible to provide the effect of easily and firmly adjusting to maximize the dynamic range of each of the tube-contacting parts 3f, from the maximum open diameter 3y to the minimum diameter (till the so-called grasping operation, though the shrinkage in the axial direction in each of the tube-contacting parts 3f is different, according to the exterior diameter of the enlargement portion of the tube), in proportion to the sliding distance of the guide-pipe 3c.

Also, according to the tube-grasping body 3 of the current invention, since a bump 3e is formed to extrude from the interior surface of each of said tube-contacting parts 3f, at the side of the opening 7b, in the axial direction of the tube 7; and a slope 3m, which has a straight or curved sloping side, is formed at said bump 3e, and slanted in the widening direction, from the summit 3p of the bump 3e, toward the opening 7b of the tube 7 facing the end-line 3o of the tube-contacting part 3f, in order to prevent said opening 7b from being deformed by collision of the bump 3e with the opening 7b of the tube 7 when the opening 7b of the tube 7 is connected at its exterior to the tube-contacting parts 3f, even if the opening 7b of the tube 7 contacts the bump 3e of the tube-contacting part, it is possible to enable the bump 3e to slide smoothly following the opening 7b of the tube 7, by the slope 3m with the sloping side being straight or curved, and it is also possible to provide the effect of surely preventing the opening 7b of the tube 7 and the tube-contacting parts 3f having the bump 3e, from being deformed or transformed.

Also, according to the tube-grasping body of the current invention, since a limiting means is installed at said tube-grasping body 3 having tube-contacting parts 3f when said tube-grasping body 3 is held by the tube-grasping body holder 3l, in order to limit the location of the radial expansion or the axial compression of the tube-contacting parts 3f of the tube-grasping body 3, for example, even if the gap between each of the end-plates (not shown in the figure) which is installed near the enlargement portion 7d of the tube 7 being inserted into the heat radiating fin 6 in a heat exchanger 5, or the gap between each of the neighboring insert tubes 7, is reduced, it is possible to support and keep the tube-grasping body 3 at such a place that any one of the tube-grasping body holders 3l is not allowed to rotate to contact the tube-contacting parts 3f of neighboring tube-grasping bodies 3, when each of the tube-contacting parts 3f of the tube-grasping body 3 is radially increased in its diameter. As a result, it is possible to provide the effect of surely avoiding deformation by collision of each of the tube-contacting parts 3f of the neighboring tube-grasping bodies 3, or deformation of said end-plate of the heat exchanger 5 by said tube-contacting parts 3f.

Also, according to said guide-pipe 3c and the tube-grasping body 3 of the current invention, since a slope 3g, which has a straight or curved sloping side, is formed on the interior circumference of said guide-pipe 3c at its end side, and slanted in the widening direction toward the opening 7b of the corresponding tube 7, in order to reduce the sliding abrasion against each of the slopes 3b formed on the exterior surface of each of said tube-contacting parts 3f; and said slope 3b is also formed, on the exterior surface of each of the tube-contacting parts 3f of said tube-grasping body 3, at such a position that the slope 3b is not allowed to reach the end-line 3o of each of said tube-contacting parts 3f, under the condition where the gap between branches of the hairpin tube or the gap between the neighboring hairpin tubes is significantly reduced comparing to the prior arts, shrinking of the diameter of each of the tube-contacting parts 3f, which is caused by the movement of the guide-pipe 3c toward the opening 7b, can be stopped before said guide-pipe 3c reaches the end-line 3o of the tube-contacting parts 3f during the shrinking operation of the diameter in each of the tube-contacting parts 3f. Thus, when the exterior diameter 3q of the guide-pipe 3c, which is being connected at the exterior of the tube-grasping body 3 having the tube-contacting parts 3f, is determined as the reference diameter (the interior diameter 3r of the guide-pipe 3c when viewed from itself), the exterior diameter 3n measured between the summits of the slopes 3b of the opposing tube-contacting parts 3f which are faced each other, and whose diameter is being reduced during the enlargement through the slits 3a, it is possible to set the enlargement-occurring point 3s, where the diameter of the tube-contacting parts 3f becomes to be the exterior diameter 3n during the compression in the diameter of the tube-contacting parts 3f, at the location 3t, the location shifted from the end-line 3o of said tube-contacting parts 3f toward the side of the opening 7b, the opposite side of said end-line 3o of the tube-contacting part 3f. Thus, it is possible to decrease the interior diameter 3r of the guide-tube 3c by the distance shifted. As a result, the exterior diameter 3q of the guide-pipe 3c is automatically reduced. Also, even if the gap between branches of the hairpin tube 7, the gap between each of the neighboring hairpin tubes 7, or the gap between each of the straight insert tubes is significantly reduced comparing to the prior arts, it is possible to prevent the guide-pipe 3c whose diameter 3q has been decreased, from being hit by each of the neighboring guide-pipes 3c, when the opening 7b of each of straight tubes or hairpin tubes is being connected at its exterior by the tube-contacting parts of the tube-grasping body 3 equipped with said guide-pipe 3c. Thus, it is possible to provide an effect of well producing the heat exchanger 5, wherein the gap between insert tubes is significantly reduced for the following example cases: the case where the heat exchanger is downsized (downsized insert pipes, etc.) due to reasons of saving in energy or cost, the case where straight tubes or hairpin tubes 7 are inserted in a zigzag pattern, and the case where straight tubes or hairpin tubes are inserted in multiple columns such as columns of 3, 4, or etc.

Also, according to the heat exchanger production apparatus 1 of the current invention, as the apparatus wherein the tube-grasping body is also connectable at the exterior of a tube-enlarging mandrel 2, for moving back and forth, along said tube-enlarging mandrel 2 which is penetrable from the opening 7b of a tube 7 inserted into a heat radiating fin 6 of a heat exchanger 5;

the tube-grasping body is also equipped with a plurality of tube-contacting parts 3f, capable of radially expanding or axially compressing in the cross direction of the longitudinal length of said tube 7;

the tube-grasping body is also equipped with slopes 3b slanting gradually in the widening direction toward the opening 7b of the corresponding tube, wherein each of the slopes 3b is formed on the exterior surface of each of said tube-contacting parts 3f;

the tube-grasping body is also equipped with a sliding means which radially expands or axially compresses each of said tube-contacting parts 3f, by sliding back and forth in the longitudinal direction of the tube, along said slopes 3b of the tube-contacting parts 3f;

a bump 3*e* is formed to extrude from the interior surface of each of said tube-contacting parts 3*f*, at the side of the opening 7*b*, in the axial direction of the tube 7;

a slope 3*m*, which has a straight or curved sloping side, is formed at said bump 3*e*, and slanted in the widening direction, from the summit 3*p* of the bump 3*e*, toward the opening 7*b* of the tube 7 facing the end-line 3*o* of the tube-contacting part 3*f*, in order to prevent said opening 7*b* from being deformed by collision of the bump 3*e* with the opening 7*b* of the tube 7 when the opening 7*b* of the tube 7 is connected at its exterior to the tube-contacting parts 3*f*;

a slope 3*g*, which has a straight or curved sloping side, is formed on the interior circumference of said guide-pipe 3*c* at its end side, and slanted in the widening direction toward the opening 7*b* of the corresponding tube 7, in order to reduce the sliding abrasion against each of the slopes 3*b* formed on the exterior surface of each of said tube-contacting parts 3*f*; and said slope 3*b* is also formed, on the exterior surface of each of the tube-contacting parts 3*f* of said tube-grasping body 3, at such a position that the slope 3*b* is not allowed to reach the end-line 3*o* of each of said tube-contacting parts 3*f*;

since said tube-contacting parts 3*f*, capable of radially expanding or axially compressing, are formed and separated by a plurality of slits 3*a* which are of prescribed widths 3*u*, and which are formed in the longitudinal direction of the tube-grasping body 3, the same direction of the movement of the tube-enlarging mandrel 2; and the width of each of said slits 3*a* is gradually increased from said prescribed width 3*u* to an expanded width 3*x*, from a prescribed location toward the opening 7*b* of said tube 7;

when the side of the opening 7*b* of the tube 7 is being connected at its exterior to the tube-contacting parts 3*f*, it is possible to expand the maximum open diameter 3*y* and the dynamic range of each of the tube-contacting parts 3*f* (said dynamic range is measured from the difference in diameters between the expansion and the compression states), through the plural slits 3*a* which are separated by a prescribed width 3*u*, and which are formed in the longitudinal direction of the tube-grasping body 3 to set up said tube-contacting parts 3*f*. Therefore, even if the exterior diameter 7*i* of the enlargement portion 7*d* at the side of the opening 7*b* of the tube 7 becomes about the same size as the interior diameter of the tube-grasping body 3 itself or the interior diameter between the tube-contacting parts 3*f* (the interior diameter between the bumps, if bumps are formed), or, if the axis of the enlargement portion 7*d* is away, by a small degree, relative to the longitudinal direction of the tube-enlarging mandrel, from the axis of the tube-grasping body 3, it is possible, by each of the tube-contacting parts 3*f* whose maximum open diameter 3*y* and the dynamic range have been expanded, to provide the effect of surely preventing one end from being deformed or transformed by collision of the end-line of the tube-contacting part 3*f* and the opening 7*b* of the tube 7.

According to the current invention, in the heat exchanger production apparatus 1 configured as above, even if the diameter of hairpin tubes 7 in a heat exchanger 5 being enlarged is different according to the spec of the heat exchanger 5, it is possible for the tube-contacting parts 3*f* to firmly grasp the tube 7, by adjusting each of the tube-contacting parts 3*f* of the tube-grasping body 3 to automatically adapt to the diameter of the tubes through the slits 3*a* which are formed between each of said tube-contacting parts 3*f*. Also, the bumps 3*e*, which are formed at said tube-contacting parts 3*f*, press the circumferential surface 7*e* of the enlargement portion 7*d* at the side of opening 7*b* of hairpin tubes 7, in order to build up extruded-parts 7*g* extruding in the axial direction of the tube 7. Thus, it is possible to accurately set the reference location of the opening 7*b* during the enlargement process so that producing a high precision heat exchanger is possible by the higher precision enlarging process. Also, since the slope 3*b* is formed, on the exterior surface of each of the tube-contacting parts 3*f* of said tube-grasping body 3, at such a position that said slope 3*b* is not allowed to reach the end-line 3*o* of each of said tube-contacting parts 3*f*, even if the gap between branches of the hairpin tube or the gap between the neighboring hairpin tubes is significantly reduced comparing to the prior arts, shrinking of the diameter of each of the tube-contacting parts 3*f*, which is caused by the movement of the guide-pipe 3*c* toward the opening 7*b*, can be stopped before said guide-pipe 3*c* reaches the end-line 3*o* of the tube-contacting parts 3*f*.

Thus, when the exterior diameter 3*q* of the guide-pipe 3*c*, which is being connected at the exterior of the tube-grasping body 3 having the tube-contacting parts 3*f*, is determined as the reference diameter (the interior diameter 3*r* of the guide-pipe 3*c* when viewed from itself), the exterior diameter 3*n* measured between the summits of the slopes 3*b* of the opposing tube-contacting parts 3*f* which are faced each other, and whose diameter is being reduced during the enlargement through the slits 3*a*, it is possible to set the enlargement-occurring point 3*s*, where the diameter of the tube-contacting parts 3*f* becomes to be the exterior diameter 3*n* during the compression in the diameter of the tube-contacting parts 3*f*, at the location 3*t*, the location shifted from the end-line 3*o* of said tube-contacting parts 3*f* toward the side of the opening 7*b*, the opposite side of said end-line 3*o* of the tube-contacting part. Thus, it is possible to decrease the interior diameter 3*r* of the guide-tube 3*c* by the distance shifted. As a result, the exterior diameter 3*q* of the guide-pipe 3*c* is automatically reduced. Also, even if the gap between branches of the hairpin tube 7, the gap between each of the neighboring hairpin tubes 7, or the gap between each of the straight insert tubes is significantly reduced comparing to the prior arts, it is possible to prevent the guide-pipe 3*c* whose diameter 3*q* has been decreased, from being hit by each of the neighboring guide-pipes 3*c*, when the opening 7*b* of each of straight tubes or hairpin tubes is being connected at its exterior by the tube-contacting parts of the tube-grasping body 3 equipped with said guide-pipe 3*c*. Thus, it is possible to provide an effect of well producing the heat exchanger 5, wherein the gap between insert tubes is significantly reduced for the following example cases: the case where the heat exchanger is downsized (downsized insert pipes, etc.) due to reasons of saving in energy or cost, the case where straight tubes or hairpin tubes 7 are inserted in a zigzag pattern, and the case where straight tubes or hairpin tubes are inserted in multiple columns such as columns of 3, 4, or etc.

Also, according to the current invention, in the heat exchanger production apparatus 1 configured as above, since the slope 3*b* is formed on the exterior surface of each of said tube-contacting parts 3*f* of said tube-grasping body 3, at the rear side of the bump 3*e* which is formed at the side of the opening 7*b* on the interior surface of each of said tube-contacting parts 3*f*, the opposite side of the end-line 3*o* of the tube-contacting part 3*f*, in such a way that said slope 3*b* is not allowed to reach the end-line 3*o* of each of the tube-contacting parts 3*f* of said tube-grasping body 3, it is possible to set the enlargement-occurring point $3s$, where the diameter of the tube-contacting parts $3f$ becomes to be the exterior diameter $3n$ during the compression in the diameter of the tube-contacting parts $3f$, at the location $3t$, the farthermost location shifted from the end-line $3o$ of said tube-contacting parts $3f$ toward the side of the opening $7b$, the opposite side of said end-line $3o$ of the tube-contacting part. Thus, it is possible to minimize the interior diameter $3r$ of the guide-tube $3c$ by the distance shifted. As a result, the exterior diameter $3q$ of the guide-pipe $3c$ can be set at a minimum. Also, even if the gap between branches of the hairpin tube 7, the gap between each of the neighboring hairpin tubes 7, or the gap between each of the straight insert tubes is extremely reduced comparing to the prior arts, it is possible to prevent the guide-pipe $3c$ whose diameter $3q$ has been minimized, from being hit by each of the neighboring guide-pipes $3c$, when the opening $7b$ of each of straight tubes or hairpin tubes is being connected at its exterior by the tube-contacting parts of the tube-grasping body 3 equipped with said guide-pipe $3c$. Thus, it is possible to provide an effect of best producing the heat exchanger 5, wherein the gap between insert tubes is extremely reduced for the following example cases: the case where the heat exchanger is extremely downsized (extremely downsized insert pipes, etc.) due to reasons of saving in energy or cost, the case where straight tubes or hairpin tubes 7 are inserted in a zigzag pattern, and the case where straight tubes or hairpin tubes are inserted in multiple columns such as columns of 3, 4, or etc.

Also, according to the current invention, in the heat exchanger production apparatus 1 configured as above, since said tube-grasping body 3 is equipped with a tool-joining part $3j$ for joining or disjoining said tube-grasping body 3, to or from the tube-grasping body holder $3l$, it is possible to enable quick change of the tube-grasping body 3 which has been worn, by simply connecting a tool, such as a driver, to the tool-joining part $3j$, and by rotating said tool. Also, it is possible to provide a special effect of enabling to change the tube-grasping body 3 easily, firmly, and within a very short time, adapting to the gap between branches of the hairpin tube 7, the gap between the neighboring hairpin tubes 7, or the gap between or the diameter of each of the neighboring straight insert tubes.

Also, according to the current invention, in the heat exchanger production apparatus 1 configured as above, if a limiting means is installed at said tube-grasping body 3 with tube-contacting parts $3f$ when said tube-grasping body 3 is held by the tube-grasping body holder $3l$, in order to limit the location of the radial expansion or the axial compression of the tube-contacting parts $3f$ of the tube-grasping body 3, for example, even if the gap between each of the end-plates (not shown in the figure) which is installed near the enlargement portion $7d$ of the tube 7 being inserted into the heat radiating fin 6 in a heat exchanger 5, or the gap between each of the neighboring insert tubes 7, is reduced, it is possible to support and keep the tube-grasping body 3 at such a place that any one of the tube-grasping body holders $3l$ is not allowed to rotate to contact the tube-contacting parts $3f$ of neighboring tube-grasping bodies 3, when each of the tube-contacting parts $3f$ of the tube-grasping body 3 is radially increased in its diameter. As a result, it is possible to provide the effect of surely avoiding deformation by collision of each of the tube-contacting parts $3f$ of the neighboring tube-grasping bodies 3, or deformation of said end-plate of the heat exchanger 5 by said tube-contacting parts $3f$.

Also, according to the current invention, in the heat exchanger production apparatus 1 configured as above, since said guide-pipe $3c$ is equipped with a tool-joining part $3i$ for joining or disjoining the guide-pipe $3c$, to or from the guide-pipe holder $3d$, it is possible to enable quick change of the guide-pipe $3c$ which has been worn, by simply rotating a tool, such as driver, to the tool-joining part $3i$, and by rotating said tool. Also, it is possible to provide a special effect of enabling to change the guide-pipe $3c$ easily, firmly, and within a very short time, adapting to the gap between branches of the hairpin tube 7, the gap between the neighboring hairpin tubes 7, or the gap between or the diameter of each of the neighboring straight insert tubes.

BRIEF DESCRIPTION OF THE DRAWINGS

FIG. 3 illustrates the status of the slits of the tube-grasping body used in the heat exchanger production apparatus of the present invention, before the slits are opened, wherein 3A is a front view and 3B is a cross-sectional diagram along the H-H line shown in 3A.

FIG. 4 illustrates the guide-pipe used in the heat exchanger production apparatus of the present invention, where 4A is an enlarged diagram, 4B is a front view, and 4C is a cross-sectional diagram along the I-I line shown in 4B.

DETAILED DESCRIPTION OF THE INVENTION

The current invention relates to a tube-grasping body for grasping an insert tube in a heat exchanger, heat exchanger production methods and apparatuses utilizing the tube-grasping body, and an air-conditioner and/or its outdoor unit with a heat exchanger produced by the method or the apparatus. In the following paragraphs, an embodiment of the current invention is explained.

The embodiment explained here relates to production of the following heat exchangers as examples:
- a heat exchanger which is downsized, utilizing the heat exchanger production apparatus which is equipped with a guide-pipe as a sliding means, and which is also equipped with a tube-grasping body being connected at its exterior to said guide-pipe for enabling said guide-pipe to slide along said tube-grasping body, and
- a heat exchanger wherein the diameters of insert tubes are different or the gap between each of the tubes is significantly reduced.

However, in association with said heat exchanger production apparatus, the parts, which are identical to the prior arts, are not explained. Separate explanation is provided later about an embodiment of a tube-grasping body, wherein the slit with a prescribed width is gradually expanded to an expanded width from a prescribed location toward the opening of the tube, since its effect is different from that of an embodiment of a tube-grasping body with the slits which are not expanded in their widths.

Figure 1:
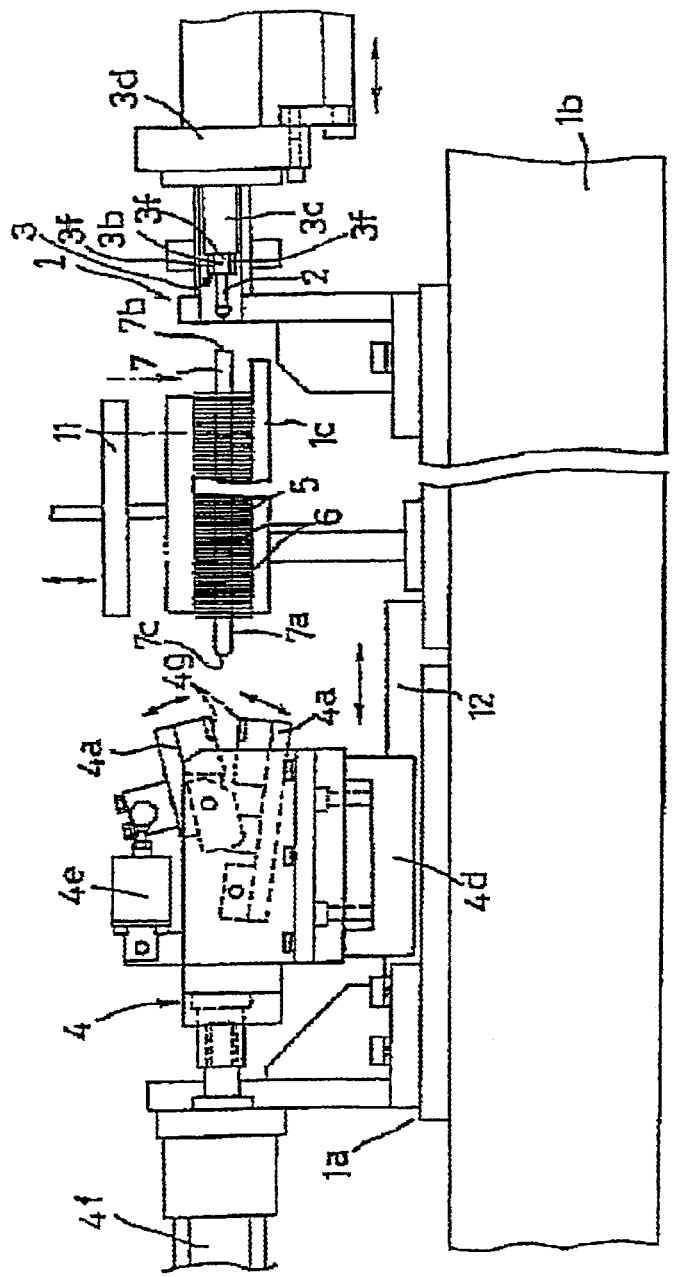
FIG. 1 illustrates a schematic diagram of a heat exchanger production apparatus according to the present invention.

First, in FIG. 1, it is explained about an embodiment of the heat exchanger production apparatus to implement the heat exchanger production method, the method having a guide-pipe and a tube-contacting part itself of the tube-grasping body for grasping an insert tube in a heat exchanger. The component-loading platform 1c loads a heat exchanger where the gap between branches of each of insert tubes or the gap between neighboring hairpin tubes 7 is significantly reduced, due to the following reasons:
- the heat exchanger being downsized (by downsized tubes, or etc.) due to the problems of saving in energy or cost,
- hairpin tubes 7 being inserted into the heat radiating fin 6 in a zigzag pattern (not shown in the figure), and
- hairpin tubes 7 being inserted in multiple columns such as columns of 3, 4, or etc. (not shown in the figure).

Subsequently, said heat exchanger 5 is pressed and fixed between the component-loading platform 1c and the pressing-plate 11 by lowering the pressing-plate 11 located above.

Figure 11:
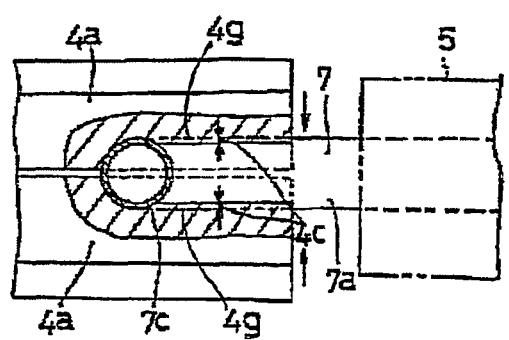
FIG. 11 illustrates an enlarged cross-sectional diagram of some of major components of the enclosing bodies, which is used in a heat exchanger production apparatus according to the prior arts.
Figure 12A:
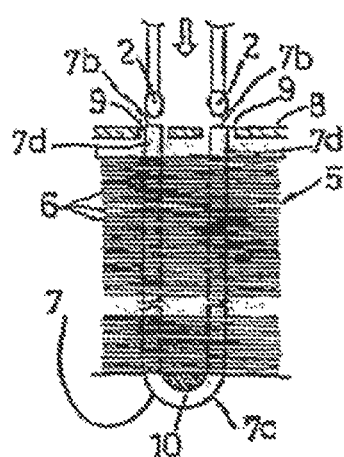
FIG. 12 illustrates a heat exchanger production apparatus of the prior arts, wherein 12A is an enlarged front view when the insert tube is enlarged, 12B is a perspective diagram of the clamp, and 12C is a perspective diagram of another embodiment of the clamp.
Figure 12B:
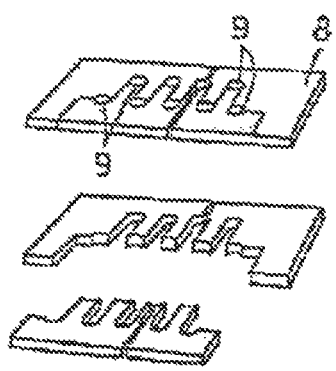
Figure 12C:
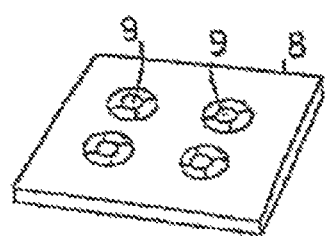

Next, the base plane 4d is advanced (not shown in the figure) along the guide rail 12, by operating the round-trip cylinder 4f of the enclosing-body shifting device 4. At the same time, the driving-cylinder 4e is operated, in order to enclose each of the hairpin part 7c extruded from the heat radiating fin 6 of the heat exchanger 5, as indicated in FIG. 11, by the tongue shaped concavity 4g which resembles a tongue when viewed from the plane of a pair of enclosing-bodies 4a. Corresponding to said tongue shaped concavity 4g, the tongue shaped convexity 4c, which resembles a tongue when viewed from said plane, is formed on the interior surface of said tongue shaped concavity 4g. Said tongue shaped convexity 4c turns around the U-shaped interior circumferential surface of said hairpin part 7c in order to firmly stop shrinkage of the hairpin tube 7 during the enlarging process.

Figure 2A:
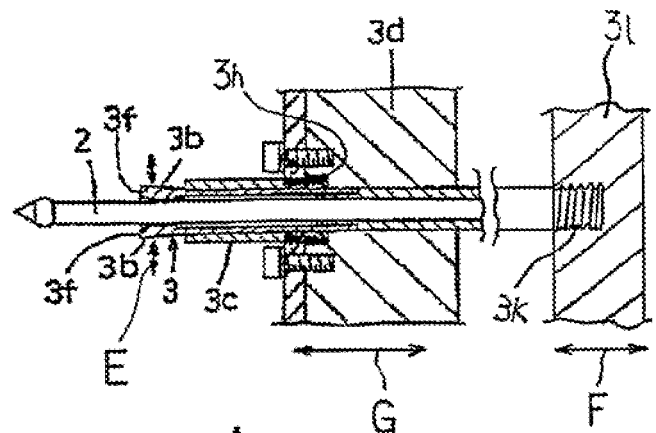
FIG. 2 illustrates an embodiment of the heat exchanger production apparatus of the present invention, where 2A is an enlarged cross-sectional diagram showing major components, 2B is an enlarged diagram showing major components, 2C and 2D are enlarged cross-sectional diagrams of some of major components when insert tubes are enlarged.
Figure 2B:
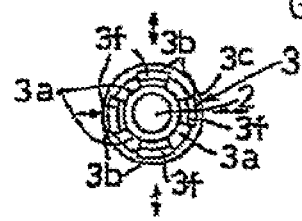
Figure 2C:
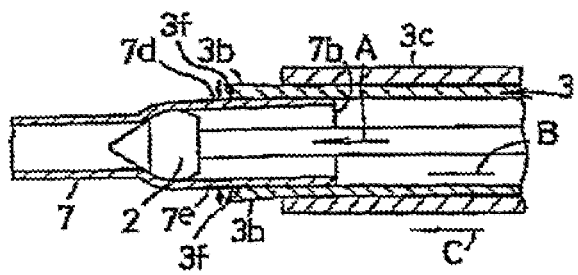

Next, from the opening 7b of each of said hairpin tubes 7, as shown in FIG. 2(c), by inserting (the arrow A) each of the tube-enlarging mandrels 2 by a prescribed depth, the enlargement portion 7d with a prescribed length is formed. Subsequently, by advancing (the arrow B) the tube-grasping body 3, by the tube-grasping body holder 3l, toward the circumferential surface 7e of said enlargement portion 7d, from the opening 7b of the hairpin tube 7, the tube-grasping body 3 is connected to the circumferential surface 7e, in the state where the exterior of said circumferential surface 7e is surrounded by the tube-contacting parts 3f.

Figure 2D:
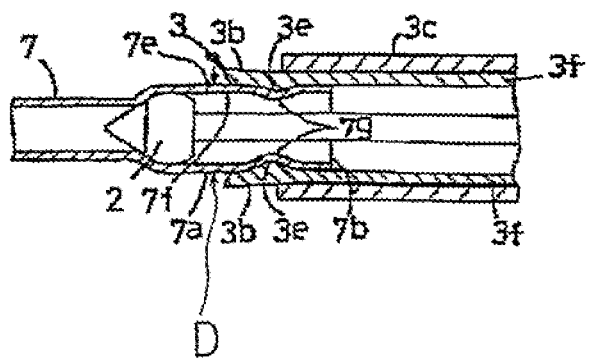
Figure 5A:
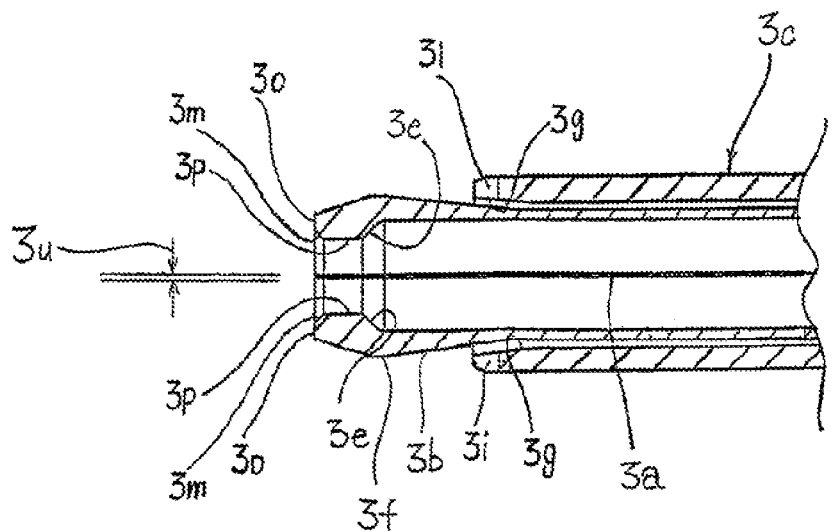
FIG. 5 illustrates the status of the slits of the tube-grasping body used in the heat exchanger production apparatus of the present invention, before the slits are opened, wherein 5A is a cross-sectional diagram before the insert tube is grasped, and 5B is a cross-sectional diagram after the insert tube is grasped.
Figure 5B:
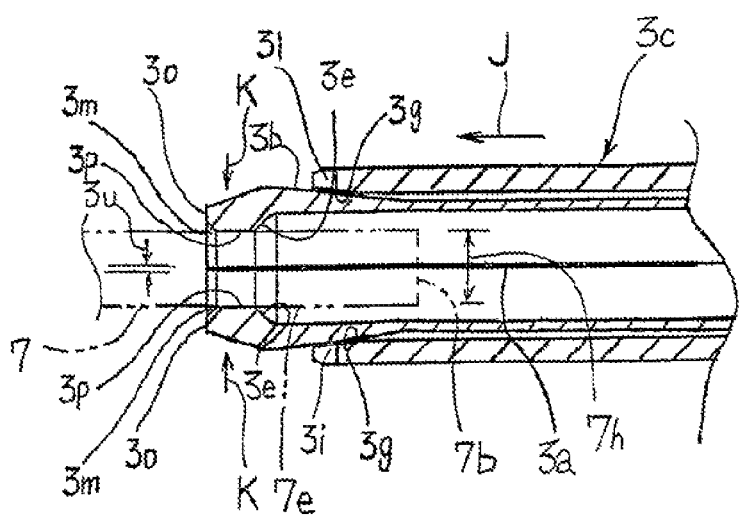

Afterwards, if the guide-pipe 3c is moved (the arrow C), by the guide-pipe holder 3d, in the same direction of the movement of the tube-enlarging mandrel 2, the guide-pipe 3c presses the slope 3b while sliding along the same slope which has been formed on the exterior surface of each of said tube-contacting parts 3f, and which is slanted in the widening direction toward the opening 7b of the corresponding tube 7. Thus, the diameter of each of the tube-contacting parts 3f is reduced in the axial direction of the tube-enlarging mandrel 2, by the space isolation of the prescribed width 3u of the slits 3a. As a result, each of said tube-contacting parts 3f becomes tightly connected at its exterior to the guide-pipe 3c, and, therefore, each of said tube-contacting parts 3f becomes to firmly grasp and support the circumferential surface 7e of the enlargement portion 7d of the hairpin tube 7. The tube-grasping body 3 with such guide-pipe 3c and tube-contacting parts 3f is shown in FIGS. 3-5, which are explained later. Specially, as shown in FIG. 2(d), a bump 3e is formed at each of the tube-contacting parts 3f for pressing (the arrow D) the circumferential surface 7e of said enlargement portion 7d (though the bump explained in FIG. 2(d) is little different in its shape from the bump 3e in FIGS. 3~5, their functions are the same), at the position where each of the tube-contacting parts meets the enlargement portion 7d of the hairpin tube 7, in order to build up the extruded-part 7g extruding from the interior circumferential surface 7f of said hairpin 7, in the axial direction of the tube-enlarging mandrel 2. Thus, the circumferential surface 7e of the enlargement portion 7d becomes more firmly grasped and supported. Therefore, it is possible to surely set the reference location of the opening 7b during the enlargement process. Next, from this state, if said tube-enlarging mandrel 2 is moved toward the hairpin part 7c of the hairpin tube 7, both of the hairpin part 7c and the opening 7b are supported. Thus, it is possible to keep shrinkage of the entire length of the hairpin tubes 7 at a minimum, and it is also possible to produce a high quality heat exchanger having higher precision.

Also, when producing a heat exchanger where the gap between branches of the insert tube or the gap between neighboring hairpin tubes is significantly reduced, since the heat exchanger production apparatus 1 having the tube-grasping body 3 and the guide-pipe 3c indicated in FIGS. 3-5 is configured by the following conditions wherein
- the tube-grasping body is also connectable at the exterior of a tube-enlarging mandrel 2, for moving back and forth, along said tube-enlarging mandrel 2 which is penetrable from the opening 7b of a tube 7 inserted into a heat radiating fin 6 of a heat exchanger 5;
- the tube-grasping body is also equipped with a plurality of tube-contacting parts 3f, capable of radially expanding or axially compressing in the cross direction of the longitudinal length of said tube 7;

the tube-grasping body is also equipped with slopes 3*b* slanting gradually in the widening direction toward the opening 7*b* of the corresponding tube, wherein each of the slopes 3*b* is formed on the exterior surface of each of said tube-contacting parts 3*f*;

the tube-grasping body is also equipped with a sliding means which radially expands or axially compresses each of said tube-contacting parts 3*f*, by sliding back and forth in the longitudinal direction of the tube, along said slopes 3*b* of the tube-contacting parts 3*f*;

a bump 3*e* is formed to extrude from the interior surface of each of said tube-contacting parts 3*f*, at the side of the opening 7*b*, in the axial direction of the tube 7;

a slope 3*m*, which has a straight or curved sloping side, is formed at said bump 3*e*, and slanted in the widening direction, from the summit 3*p* of the bump 3*e*, toward the opening 7*b* of the tube 7 facing the end-line 3*o* of the tube-contacting part 3*f*, in order to prevent said opening 7*b* from being deformed by collision of the bump 3*e* with the opening 7*b* of the tube 7 when the opening 7*b* of the tube 7 is connected at its exterior to the tube-contacting parts 3*f*;

a slope 3*g*, which has a straight or curved sloping side, is formed on the interior circumference of said guide-pipe 3*c* at its end side, and slanted in the widening direction toward the opening 7*b* of the corresponding tube 7, in order to reduce the sliding abrasion against each of the slopes 3*b* formed on the exterior surface of each of said tube-contacting parts 3*f*; and said slope 3*b* is also formed, on the exterior surface of each of the tube-contacting parts 3*f* of said tube-grasping body 3, at such a position that the slope 3*b* is not allowed to reach the end-line 3*o* of each of said tube-contacting parts 3*f*;

even if the diameter of the hairpin tube 7 in a heat exchanger 5 being enlarged is different according to the spec of the heat exchanger 5, for example, as shown in FIG. 5, by advancing the tube-grasping body 3, by the tube-grasping body holder 3*l* (not shown in the figure), toward the enlargement portion 7*d* of the tube 7 having a reference diameter of a prescribed tube diameter 7*h*, the tube-grasping body 3 becomes connected to the exterior of said tube 7. Then, by advancing said guide-pipe 3*c* (the arrow J), by the guide-pipe holder 3*c* (not shown in the figure), toward the opening 7*b* of the tube 7, each of tube-contacting parts 3*f* of said tube-grasping body 3 becomes to grasp the enlargement portion 7*d* of the tube 7 with a prescribed diameter 7*h*, by shrinking (the arrow K) of the diameter of each of tube-contacting parts 3*f* of said tube-grasping body 3, through the space distance of the slits 3*a* which are formed between said tube-contacting parts 3*f*, and which are of prescribed widths 3*u*. Also, the bumps 3*e*, which are formed at said tube-contacting parts 3*f*, press the circumferential surface 7*e* of the enlargement portion 7*d* and build up the extruded-parts 7*g* (not shown in the figure) extruding in the axial direction of the tube 7. Thus, the tube-contacting parts become to firmly grasp and support the tube, and, therefore, it is possible to accurately set the reference point of the opening 7*b* during the enlarging process, in order to produce a high precision heat exchanger by the higher precision enlarging process. Also, even if the gap between branches of the hairpin tube 7 or the gap between neighboring hairpin tubes is significantly reduced comparing to the prior arts, since the slope 3*b* is formed, on the exterior surface of each of the tube-contacting parts 3*f* of said tube-grasping body 3, at such a position that said slope 3*b* is not allowed to reach the end-line 3*o* of each of said tube-contacting parts 3*f*, during the phase where the diameter of each of the tube-contacting parts 3*f* is being reduced, shrinking of the diameter of each of the tube-contacting parts 3*f*, which is caused by the movement of the guide-pipe 3*c* toward the opening 7*b*, can be stopped before said guide-pipe 3*c* reaches the end-line 3*o* of the tube-contacting parts 3*f*.

Thus, when the exterior diameter 3*q* of the guide-pipe 3*c*, which is being connected at the exterior of the tube-grasping body 3 having the tube-contacting parts 3*f*, is determined as the reference diameter (the interior diameter 3*r* of the guide-pipe 3*c* when viewed from itself), the exterior diameter 3*n* measured between summits of the slopes 3*b* of the opposing tube-contacting parts 3*f* which are faced each other, and whose diameter is being reduced during the enlargement through the slits 3*a*, it is possible to set the enlargement-occurring point 3*s*, where the diameter of the tube-contacting parts 3*f* becomes to be the exterior diameter 3*n* during the compression in the diameter of the tube-contacting parts 3*f*, at the location 3*t*, the location shifted from the end-line 3*o* of said tube-contacting parts 3*f* toward the side of the opening 7*b*, the opposite side of said end-line 3*o* of the tube-contacting part. Thus, it is possible to decrease the interior diameter 3*r* of the guide-tube 3*c* by the distance shifted. As a result, the exterior diameter 3*q* of the guide-pipe 3*c* is automatically reduced. Also, even if the gap between branches of the hairpin tube 7, the gap between each of the neighboring hairpin tubes 7, or the gap between each of the straight insert tubes is significantly reduced comparing to the prior arts, it is possible to prevent the guide-pipe 3*c* whose diameter 3*q* has been decreased, from being hit by each of the neighboring guide-pipe 3*c*, when the opening 7*b* of each of straight tubes or hairpin tubes is being connected at its exterior by the tube-contacting parts of the tube-grasping body 3 equipped with said guide-pipe 3*c*. Thus, it is possible to provide an effect of well producing the heat exchanger 5, wherein the gap between insert tubes is significantly reduced for the following example cases: the case where the heat exchanger is downsized (downsized insert tubes, etc.) due to reasons of saving in energy or cost, the case where straight tubes or hairpin tubes 7 are inserted in a zigzag pattern, and the case where straight tubes or hairpin tubes are inserted in multiple columns such as columns of 3, 4, or etc.

Also, relating to FIGS. 3~5, if the slope 3*b* is formed on the exterior surface of each of said tube-contacting parts 3*f* of said tube-grasping body 3, at the rear side of the bump 3*e* which is formed at the side of the opening 7*b* on the interior surface of each of said tube-contacting parts 3*f*, the opposite side of the end-line 3*o* of the tube-contacting part 3*f*, in such a way that said slope 3*b* is not allowed to reach the end-line 3*o* of the tube-contacting part 3*f* of said tube-grasping body 3, it is possible to set the enlargement-occurring point 3*s*, where the diameter of the tube-contacting parts 3*f* becomes to be the exterior diameter 3*n* during the compression in the diameter of the tube-contacting parts 3*f*, at the location 3*t*, the farthermost location shifted from the end-line 3*o* of said tube-contacting parts 3*f* toward the side of the opening 7*b*, the opposite side of said end-line 3*o* of the tube-contacting part 3*f*. Thus, it is possible to minimize the interior diameter 3*r* of the guide-tube 3*c* by the distance shifted. As a result, the exterior diameter 3*q* of the guide-pipe 3*c* can be set at a minimum. Also, even if the gap between branches of the hairpin tube 7, the gap between each of the neighboring hairpin tubes 7, or the gap between each of the straight insert tubes is extremely reduced comparing to the prior arts, it is possible to prevent the guide-pipe 3*c* whose diameter 3*q* has been minimized, from being hit by each of the neighboring guide-pipe 3*c*, when the opening 7b of each of straight tubes or hairpin tubes is being connected at its exterior by the tube-contacting parts of the tube-grasping body 3 equipped with said guide-pipe 3c. Thus, it is possible to provide an effect of best producing the heat exchanger 5, wherein the gap between insert tubes is extremely reduced for the following example cases: the case where the heat exchanger is extremely downsized (extremely downsized insert tubes, etc.) due to reasons of saving in energy or cost, the case where straight tubes or hairpin tubes 7 are inserted in a zigzag pattern, and the case where straight tubes or hairpin tubes are inserted in multiple columns such as columns of 3, 4, or etc.

Also, according to the tube-grasping body 3 configured as above, if said tube-grasping body 3 is equipped with a tool-joining part 3j for joining or disjoining said tube-grasping body 3, to or from the tube-grasping body holder 3l, it is possible to enable quick change of the tube-grasping body 3 which has been worn, by simply connecting a tool, such as a driver, to the tool-joining part 3j, and by rotating said tool. Also, it is possible to provide an effect of enabling to change the tube-grasping body 3 easily, firmly, and within a very short time, perfectly adapting to the gap between branches of the hairpin tube 7, the gap between the neighboring hairpin tubes 7, or the gap between or the diameter of each of the neighboring straight insert tubes.

Also, relating to the guide-pipe 3c configured as above, if said guide-pipe 3c is equipped with a tool-joining part 3i for joining or disjoining the guide-pipe 3c, to or from the guide-pipe holder 3d, it is possible to enable quick change of the guide-pipe 3c which has been worn, by simply rotating a tool, such as driver, to the tool-joining part 3i, and by rotating said tool. Also, it is possible to provide a special effect of enabling to change the guide-pipe 3c easily, firmly, and within a very short time, perfectly adapting to the gap between branches of the hairpin tube 7, the gap between the neighboring hairpin tubes 7, or the gap between or the diameter of each of the neighboring straight insert tubes.

Next, relating to the tube-grasping body of the current invention for grasping an insert tube in a heat exchanger, an embodiment of the tube-grasping-body equipped with the tube-contacting parts 3f is explained, wherein the slits are formed for building up said contacting parts 3f, and the width of each of the slits is gradually increased from a prescribed width to an expanded width, from a prescribed location of the slit.

Figure 6A:
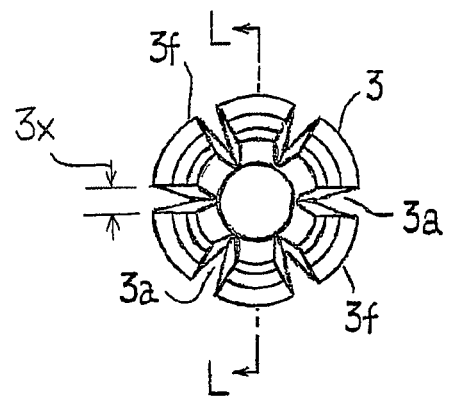
FIG. 6 illustrates the status of the slits of the tube-grasping body used in the heat exchanger production apparatus of the present invention, after the slits are opened, wherein 6A is a front view, and 6B is a cross-sectional diagram along the L-L line shown in 6A.
Figure 6B:
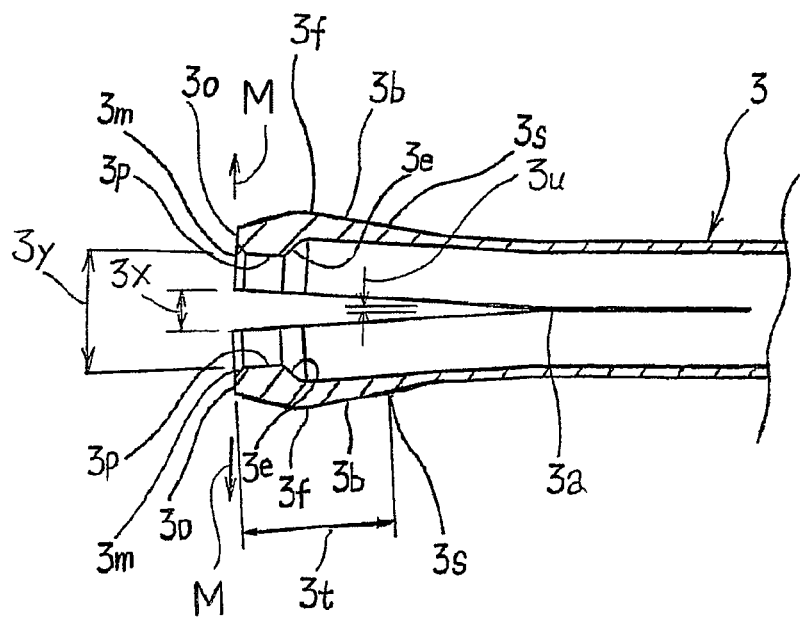

In FIG. 6, in a heat exchanger production apparatus to embody the heat exchanger production method explained above, utilizing the tube-grasping body 3 which is also connectable at the exterior of a tube-enlarging mandrel 2, for moving back and forth, along said tube-enlarging mandrel 2 which is penetrable from the opening 7b of a tube 7 inserted into a heat radiating fin 6 of a heat exchanger 5;

which is also equipped with a plurality of tube-contacting parts 3f, capable of radially expanding or axially compressing in the cross direction of the longitudinal length of said tube 7;

which is also equipped with slopes 3b slanting gradually in the widening direction toward the opening 7b of the corresponding tube, wherein each of the slopes 3b is formed on the exterior surface of each of said tube-contacting parts 3f;

which also radially expands or axially compresses each of said tube-contacting parts 3f, by a sliding means which moves back and forth in the longitudinal direction of the tube, along said slopes 3b of the tube-contacting parts 3f; and which is also characterized by the configuration wherein
said tube-contacting parts 3f, capable of radially expanding or axially compressing, are formed and separated by a plurality of slits 3a which are of prescribed widths 3u, and which are formed in the longitudinal direction of the tube-grasping body 3, the same direction of the movement of the tube-enlarging mandrel 2;

if the width of each of said slits 3a is gradually increased from said prescribed width 3u to an expanded width 3x, from a prescribed location toward the opening 7b of said tube 7, when the side of the opening 7b of the tube 7 is being connected at its exterior to the tube-contacting parts 3f, it is possible to greatly expand (the arrow M) the maximum open diameter 3y and the dynamic range (space distance) of each of the tube-contacting parts 3f (said dynamic range is measured from the difference in diameters between the expansion and the compression states), through the plural slits 3a which are separated by a prescribed width 3u, and which are formed in the longitudinal direction of the tube-grasping body 3 to build up said tube-contacting parts 3f.

Figure 7A:
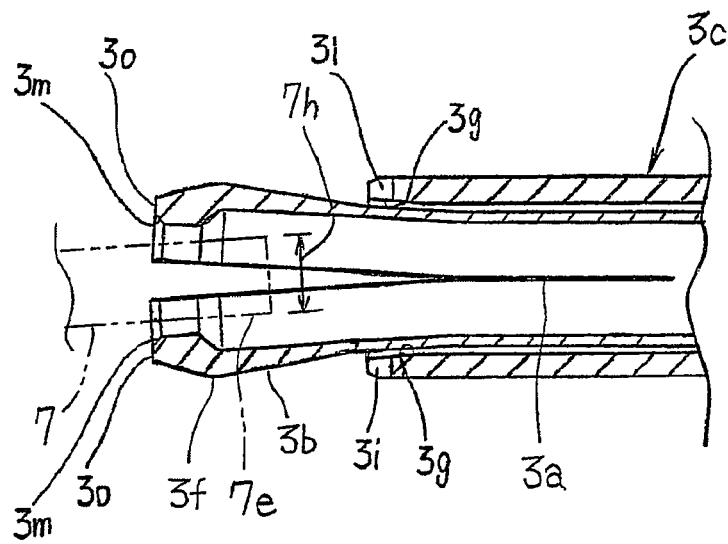
FIG. 7 illustrates the status of the slits of the tube-grasping body used in the heat exchanger production apparatus of the present invention, after the slits are opened, wherein 7A is a cross-sectional diagram when an insert tube is grasped if the axis of the insert tube is skewed off from the axis of the tube-grasping body, and 7B is a cross-sectional diagram when an insert tube with a large diameter is grasped.

Therefore, as shown in FIG. 7(a), for example, even if the axis of the enlargement portion 7d of the tube 7 having a prescribed diameter 7h is away, by a small degree, relative to the longitudinal direction of the tube-enlarging mandrel, from the axis of the tube-grasping body 3, it is possible, by each of the tube-contacting parts 3f whose maximum open diameter 3y and the dynamic range (the dynamic range being measured from the difference in diameters between the expansion and the compression states) have been greatly expanded, to provide the effect of surely preventing one end from being deformed or transformed by collision of the end-line of the tube-contacting part 3f and the opening 7b of the tube 7.

Figure 7B:
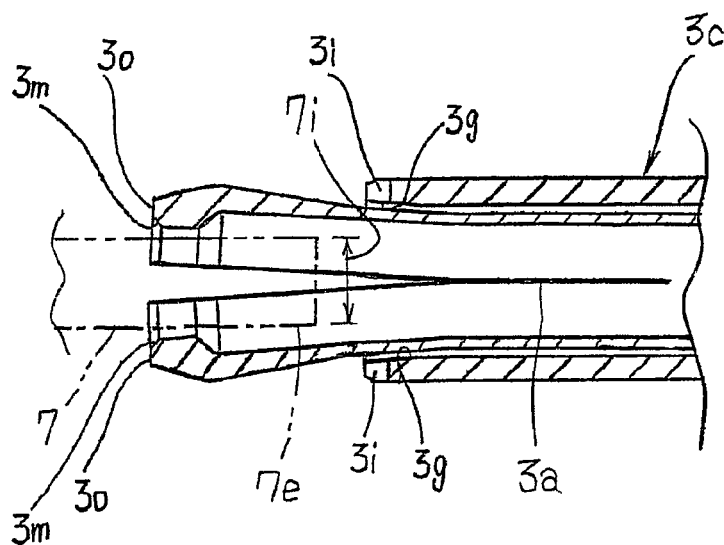

Also, as shown in FIG. 7(b), if the width of each of said slits 3a of the tube-grasping body 3 is gradually increased from said prescribed width 3u to an expanded width 3x, from a prescribed location toward the opening 7b of said tube 7, it is possible, by each of the tube-contacting parts 3f whose maximum open diameter 3y and the dynamic range have been expanded (the dynamic range is measured from the difference between diameters of the expansion and compression states), to provide the effect of surely preventing one end from being deformed or transformed by collision of the end-line of the tube-contacting part 3f and the opening 7b of the tube 7 even if the exterior diameter 7i of the enlargement portion 7d at the side of the opening 7b of the tube 7 becomes about the same size (bigger diameter than the reference diameter of a prescribed diameter 7h) as the interior diameter of the tube-grasping body 3 itself or the interior diameter between the tube-contacting parts 3f (the interior diameter between the bumps, if bumps are formed).

Also, relating to the tube-grasping body 3 configured above, if each of said tube-contacting parts 3f, capable of radially expanding or axially compressing, is bent to form a smooth curve with or without a edge on the bent portion, in the radial direction, from a prescribed location of said slit 3a toward the opening 7b of the tube 7, in order to gradually expand the width of each of said slits 3a from the prescribed width 3u to the expanded width 3x, from a prescribed location, toward the opening 7b of the tube 7, it is possible to increase durability as a component, by smoothly sliding the guide-pipe 3c along said slope 3b which is formed on each of the tube-contacting parts 3f with or without a edge on its sloping side, even if the maximum open diameter 3y and the dynamic range (said dynamic range is the difference in diameters between the expansion and the compression states) of each of the tube-contacting parts 3f are maximally expanded, through the space distance of the expanded widths 3x, the width expanded from the prescribed width 3u of the slit 3a. Also, it is possible to provide the effect of easily and firmly adjusting to maximize the dynamic range of each of the tube-contacting parts 3f, from the maximum open diameter 3y to the minimum diameter (till the so-called grasping operation, though the shrinkage in the axial direction in each of the tube-contacting parts 3f is different, according to the exterior diameter of the enlargement portion of the tube), in proportion to the sliding distance of the guide-pipe 3c.

Also, relating to the tube-grasping body 3 configured as above, since

- a bump 3e is formed to extrude from the interior surface of each of said tube-contacting parts 3f, at the side of the opening 7b, in the axial direction of the tube 7; and
- a slope 3m, which has a straight or curved sloping side, is formed at said bump 3e, and slanted in the widening direction, from the summit 3p of the bump 3e, toward the opening 7b of the tube 7 facing the end-line 3o of the tube-contacting part 3f, in order to prevent said opening 7b from being deformed by collision of the bump 3e with the opening 7b of the tube 7 when the opening 7b of the tube 7 is connected at its exterior to the tube-contacting parts 3f, even if the opening 7b of the tube 7 contacts the bump 3e of each of the tube-contacting parts 3f, it is possible to enable the bump 3e to slide smoothly following the opening 7b of the tube 7, by the slope 3m with the sloping side being straight or curved, and it is also possible to provide the effect of surely preventing the opening 7b of the tube 7 and the tube-contacting parts 3f having the bump 3e, from being deformed or transformed.

Also, relating to the tube-grasping body 3 and the guide-pipe 3c, configured as above, since

- a slope 3g, which has a straight or curved sloping side, is formed on the interior circumference of said guide-pipe 3c at its end side, and slanted in the widening direction toward the opening 7b of the corresponding tube 7, in order to reduce the sliding abrasion against each of the slopes 3b formed on the exterior surface of each of said tube-contacting parts 3f; and
- said slope 3b is also formed, on the exterior surface of each of the tube-contacting parts 3f of said tube-grasping body 3, at such a position that the slope 3b is not allowed to reach the end-line 3o of each of said tube-contacting parts 3f, under the condition where the gap between branches of the hairpin tube or the gap between the neighboring hairpin tubes is significantly reduced comparing to the prior arts, shrinking of the diameter of each of the tube-contacting parts 3f, which is caused by the movement of the guide-pipe 3c toward the opening 7b, can be stopped before said guide-pipe 3c reaches the end-line 3o of the tube-contacting parts 3f during the shrinking operation of the diameter in each of the tube-contacting parts 3f. Thus, when the exterior diameter 3q of the guide-pipe 3c, which is connected at the exterior of the tube-grasping body 3 having the tube-contacting parts 3f, is determined as the reference diameter (the interior diameter 3r of the guide-pipe 3c when viewed from itself), the exterior diameter 3n measured between the summits of the slopes 3b of the opposing tube-contacting parts 3f which are faced each other, and whose diameter is being reduced during the enlargement through the slits 3a, it is possible to set the enlargement-occurring point 3s, where the diameter of the tube-contacting parts 3f becomes to be the exterior diameter 3n during the compression in the diameter of the tube-contacting parts 3f, at the location 3t, the location shifted from the end-line 3o of said tube-contacting parts 3f toward the side of the opening 7b, the opposite side of said end-line 3o of the tube-contacting part 3f. Thus, it is possible to decrease the interior diameter 3r of the guide-tube 3c by the distance shifted. As a result, the exterior diameter 3q of the guide-pipe 3c is automatically reduced. Also, even if the gap between branches of the hairpin tube 7, the gap between each of the neighboring hairpin tubes 7, or the gap between each of the straight insert tubes is significantly reduced comparing to the prior arts, it is possible to prevent the guide-pipe 3c whose diameter 3q has been decreased, from being hit by each of the neighboring guide-pipes 3c, when the opening 7b of each of straight tubes or hairpin tubes is being connected at its exterior by the tube-contacting parts of the tube-grasping body 3 equipped with said guide-pipe 3c. Thus, it is possible to provide an effect of well producing the heat exchanger 5, wherein the gap between insert tubes is significantly reduced for the following example cases: the case where the heat exchanger is downsized (downsized insert pipes, etc.) due to reasons of saving in energy or cost, the case where straight tubes or hairpin tubes 7 are inserted in a zigzag pattern, and the case where straight tubes or hairpin tubes are inserted in multiple columns such as columns of 3, 4, or etc.

Figure 8:
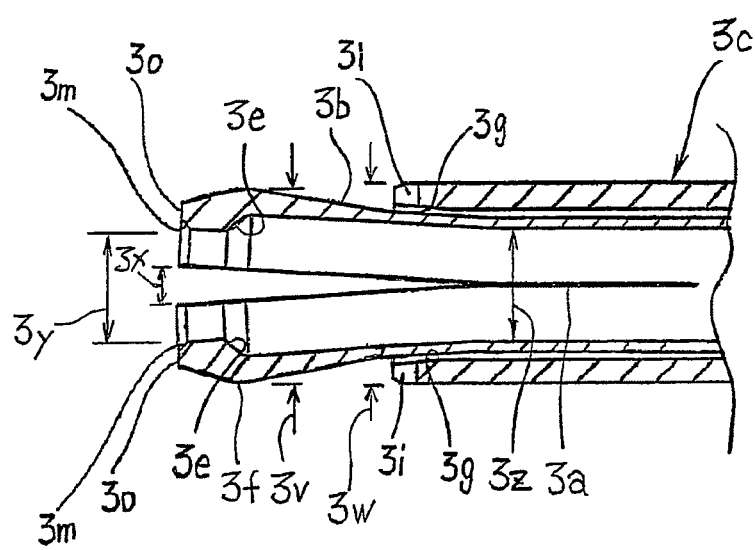
FIG. 8 illustrates an example embodiment of the slits of the tube-grasping body used in the heat exchanger production apparatus of the current invention, after the slits are opened.

Also, as shown in FIG. 8, relating to said tube-grasping body 3, since

- a sliding means is provided by the guide-pipe 3c, which moves back and forth in the longitudinal direction of the tube, along said slopes 3b of the tube-contacting parts 3f; and
- the maximum exterior diameter 3v of said tube-grasping body 3 is set below the exterior diameter 3w of the guide-pipe 3c, wherein the maximum exterior diameter 3v is formed and configured by the opposing tube-contacting parts 3f facing each other in order to build up said slopes 3b, it is possible to accommodate said tube-contacting parts 3f, which are formed and separated by the slits 3a with a prescribed width 3u, within the exterior diameter 3w of the guide-pipe 3c, in the state where the maximum open diameter 3y and the dynamic range (the dynamic range is the difference in diameters between the expansion and compression states) of each of the tube-contacting parts 3f are expanded through expansion of each of the widths of the slits 3a to a larger value than a prescribed width 3u. Therefore, it is possible to provide the effect of surely preventing collision by neighboring tube-contacting parts 3f, even for the following cases:

- the case where the space between each of the guide-pipes 3c is fully taken up, corresponding to the case where the gap between branches of the hairpin tube 7, or the gap between each of neighboring hairpin tubes 7, or the gap between each of straight tubes being inserted, is significantly reduced comparing to the prior arts, and
- the case where the enlargement portion 7d at the side of the opening 7b of the tube 7 is being grasped, by each of the tube-contacting parts 3f of each of the tube-grasping bodies 3, which is accommodated in the interior of each of the neighboring guide-pipes 3c.

Figure 9:
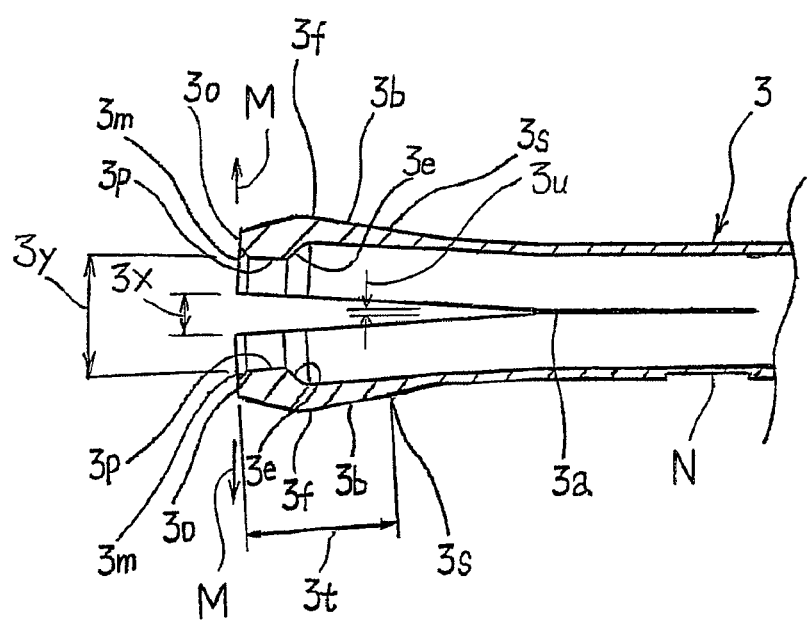
FIG. 9 illustrates another example embodiment of the slits of the tube-grasping body used in the heat exchanger production apparatus of the current invention, after the slits are opened.

Also, as indicated in FIG. 9, at the tube-grasping body 3 with said tube-contacting parts 3f, if a limiting means such as a groove or a concavity (not shown in the figure) or a convexity (not shown in the figure) is installed when said tube-grasping body 3 is held by the tube-grasping body holder 3l, in order to limit (limiting rotation of the tube-grasping body holder 3l) the location of the radial expansion or the axial compression of the tube-contacting parts 3f of the tube-grasping body 3 (though not shown in the figure, parts which correspond to the limiting means of the tube-grasping body 3, and which are fixed at the tube-grasping holder 3l or other components, are contacted and limited by such limiting means), it is possible to support and keep the tube-grasping body 3 at such a place that none of the tube-grasping body holders 3*l* is allowed to rotate to contact the tube-contacting parts 3*f* of neighboring tube-grasping bodies 3, when each of the tube-contacting parts 3*f* of the tube-grasping body 3 is radially increased in its diameter, even if the gap between each of the end-plates (not shown in the figure) which is installed near the enlargement portion 7*d* of the tube 7 being inserted into the heat radiating fin 6 in a heat exchanger 5, or the gap between each of the neighboring insert tubes 7, is reduced. As a result, it is possible to provide the effect of surely avoiding deformation by collision of each of the tube-contacting parts 3*f* of the neighboring tube-grasping bodies 3, or deformation of said end-plate of the heat exchanger 5 by said tube-contacting parts 3*f*.

If the width of each of said slits 3*a* is gradually increased from said prescribed width 3*u* to an expanded width 3*x*, from a prescribed location toward the opening 7*b* of said tube 7, when the side of the opening 7*b* is being connected at its exterior to the tube-contacting parts 3*f*, it is possible to expand the maximum open diameter 3*y* and the dynamic range of each of the tube-contacting parts 3*f* (the dynamic range is measured from the difference in diameters between the expansion and the compression states), through the plural slits 3*a* which are separated by a prescribed width 3*u*, and which are formed in the longitudinal direction of the tube-grasping body 3 to set up said tube-contacting parts 3*f*; when producing a heat exchanger by the heat exchanger production method comprising:

the first process wherein
an enlargement portion having a prescribed length is formed, by inserting a tube-enlarging mandrel by a prescribed depth, from the opening of an insert tube being inserted into a heat radiating fin of a heat exchanger;

the second process wherein
the exterior of said enlargement portion is surrounded and connected, by the tube-grasping body wherein
said tube-contacting parts, capable of radially expanding or axially compressing, are formed and separated by a plurality of slits which are of prescribed widths, and which are formed in the longitudinal direction of the tube-grasping body, the same direction of the movement of the tube-enlarging mandrel; and
the width of each of said slits is gradually increased from said prescribed width to an expanded width, from a prescribed location toward the opening of said tube;

the third process wherein
the circumferential surface of the enlargement portion of the tube is firmly grasped and supported by tube-contacting parts, as the diameter of each of the tube-contacting parts is reduced in the axial direction to gradually reduce the expanded width which has been expanded from a prescribed width from a prescribed position of the slit, by a sliding means pressing the slopes of the tube-contacting parts, while sliding, toward the opening of the corresponding tube, along the same slopes which are slanted in the widening direction toward the opening of the tube; and the forth process wherein,
in the state where the circumferential surface of the enlargement portion of the tube is firmly grasped and supported by the tube-contacting parts, the tube-enlarging mandrel is further inserted into the tube to join the heat radiating fin and the tube together.

Thus, as explained in FIG. 7(*a*) above, for example, even if the axis of the enlargement portion 7*d* of the said tube 7 having a reference diameter of a prescribed tube diameter 7*h* is away, by a small degree, relative to the longitudinal direction of the tube-enlarging mandrel 2, from the axis of the tube-grasping body 3, it is possible, by each of the tube-contacting parts 3*f* whose maximum open diameter 3*y* and the dynamic range (the dynamic range is measured from the difference of the diameters between the expansion and compression states) have been greatly expanded, to provide the effect of surely preventing one end from being deformed or transformed by a collision of the end-line of the tube-contacting part 3*f* and the opening 7*b* of the tube 7.

Also, relating to the case where a heat exchanger is produced by the method above, as shown in FIG. 7(*b*), if the width of each of said slits 3*a* of the tube-grasping body 3 is gradually increased from said prescribed width 3*u* to an expanded width 3*x*, from a prescribed location toward the opening 7*b* of said tube 7, it is possible, by each of the tube-contacting parts 3*f* whose maximum open diameter 3*y* and the dynamic range (the dynamic range is measured from the difference of the diameters between the expansion and compression states) have been expanded, to provide the effect of surely preventing one end from being deformed or transformed by collision of the end-line of the tube-contacting part 3*f* and the opening 7*b* of the tube 7, even if the exterior diameter 7*i* of the enlargement portion 7*d* at the side of the opening 7*b* of the tube 7 becomes about the same size (bigger than the reference diameter of a prescribed diameter 7*h*) as the interior diameter of the tube-grasping body 3 itself or the interior diameter between the tube-contacting parts 3*f* (the interior diameter between the bumps, if bumps are formed).

Figure 10A:
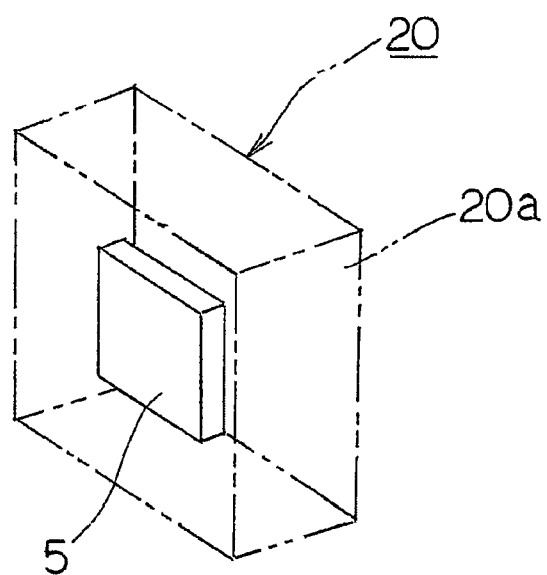
FIG. 10 illustrates an example embodiment of a product which is equipped with the heat exchanger, produced using the tube-grasping body used in the heat exchanger production apparatus of the current invention, wherein 10A is an air-conditioner having the heat exchanger and 10B is an outdoor unit having the heat exchanger to be used with an air-conditioner.
Figure 10B:
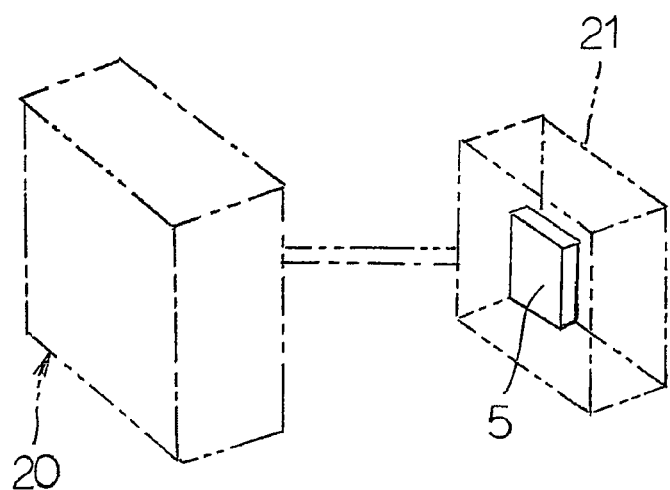

Thus, if a heat exchanger 5, produced by the method using the tube-grasping body, is placed in a prescribed casing 20*a* with various components such as an air blower (FIG. 10(*a*)), or, in an outdoor unit 21 used in an air conditioner 20 (FIG. 10(*b*)), the products adopting such a heat exchanger enables a decrease in logistics cost or product cost, due to the downsized heat exchanger due to the decrease in the tube diameter, or the gap between neighboring tubes.

Also, relating to the case where the heat exchanger, produced by the method of the current invention explained above, is used in an air conditioner 20 or in an outdoor unit 21 used in an air conditioner 20, it is not implied to exclude air conditioners such as a so-called centralized air conditioner which is referred to as either an air handling unit or a fan coil unit, or a so-called individual air conditioner which is referred to as either a package air conditioner or a room air conditioner. Thus, for any air conditioner using a heat exchanger, it is not implied to exclude anything such as its detailed configuration, the shape, the size, the system construction. Also, it does not exclude anything such as its use or sales area, if a heat exchanger produced by the method of the current invention is used in other various products.

Also, for an embodiment where tubes other than hairpin tubes are inserted, for example, for the case where multiple straight tubes (not shown in the figure) are inserted, it is not implied to limit anything such as the tube material, the shape, kinds, quantity, the insertion pattern, and etc.

Also, relating to the embodiment explained above, though a so-called vertical typed enlargement apparatus is explained, as an example of the heat exchanger production apparatus with the tube-grasping body 3 which is connected at its exterior to the guide-pipe 3*c* to enable the guide-pipe to slide along said tube-grasping body, it is not implied to exclude a so-called horizontal typed enlargement apparatus. Also, relating to the so-called vertical typed enlargement apparatus, it is not implied to exclude anything such as detailed configuration, kinds, characteristics, or etc., as well as the quantity of the tube-contacting parts, the quantity of the tube-grasping bodies or the tube-enclosing bodies, ways of arranging them, and their location of installation.

INDUSTRIAL APPLICABILITY

The current invention relates to a tube-grasping body for grasping an insert tube in a heat exchanger, heat exchanger production methods and apparatuses utilizing the tube-grasping body, and an air conditioner and/or an outdoor unit equipped with the heat exchanger produced by the methods and apparatuses; wherein the tube-grasping body enables the insert tube to be enlarged to connect to a heat radiating fin for producing a heat exchanger, still keeping the total length of insert tubes at an almost same level comparing, even after the insert tube is enlarged by inserting into each of through holes of heat radiating fins in heat exchangers overlaid in their multitudes; and said tube-grasping body prevents the opening of the tube and the end-line of each of the tube-contacting parts of the tube-grasping body, from being deformed or damaged by collision between them, and also firmly grasps the opening side of insert tubes sitting at the interior side in the heat exchanger, as well as the tubes sitting at the exterior side in the heat exchanger, in order to resolve all the problems occurring in the following example cases: the case where the gap between insert tubes is decreased to enable them to be inserted into a heat radiating fin in multiple columns such as columns of 3, 4, or etc., the case where the diameters of insert tubes being enlarged are different according to the spec of the heat exchanger, the case where the gap between each of straight tubes or hairpin tubes being inserted into said heat radiating fin is significantly decreased comparing to the prior arts, the case where the exterior diameter of the insert tube becomes about the same size as the interior diameter of the tube-grasping body itself or the interior diameter between the tube-contacting parts (the interior diameter between the bumps if bumps are formed on the interior surface of the tube-contacting parts), and the case where the axis of said enlargement portion is away, by some degree, relative to the direction of the longitudinal length of the tube-enlarging mandrel, from the axis of the tube-grasping body.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A tube-grasping body for grasping an insert tube in a heat exchanger, the tube-grasping body
   which is used in a heat exchanger production apparatus (1);
   which is also connectable at an exterior of a tube-enlarging mandrel (2) for moving back and forth, along said tube-enlarging mandrel (2) which is penetrable from an opening (7b) of a tube (7) inserted into a heat radiating fin (6) of a heat exchanger (5);
   which is also equipped with a plurality of tube-contacting parts (3f), capable of radially expanding or axially compressing in a cross direction of a longitudinal length of said tube (7);
   which is also equipped with first slopes (3b) slanting gradually in a widening direction toward the opening (7b) a corresponding tube, wherein each of the first slopes (3b) is formed on an exterior surface of each of said tube-contacting parts (3f);
   which also radially expands or axially compresses each of said tube-contacting parts (3f) by a sliding means which moves back and forth in a longitudinal direction of the tube, along said first slopes (3b) of the tube-contacting parts (3f) and
   comprising:
   a configuration wherein,
      said tube-contacting parts (3f) capable of radially expanding or axially compressing, are formed and separated by a plurality of slits (3a) which are of prescribed widths (3u), and which are formed in the longitudinal direction of the tube-grasping body (3a) a same direction of a movement of the tube-enlarging mandrel (2); and
      the width of each of said slits (3a) is gradually increased from said prescribed width (3u) to an expanded width (3x), from a prescribed location toward the opening (7b) of said tube (7).

2. A tube-grasping body according to claim 1, for grasping an insert tube in a heat exchanger, the tube-grasping body comprising:
   a configuration wherein,
      a sliding means is provided by a guide-pipe (3c), which moves back and forth in the longitudinal direction of the tube, along said first slopes (3b) of the tube-contacting parts (3f) and
      a maximum exterior diameter (3v) of said tube-grasping body (3) is set below an exterior diameter (3w) of the guide-pipe (3c), wherein the maximum exterior diameter (3v) is formed and configured by the opposing tube-contacting parts (3f) facing each other in order to build up said first slopes (3b).

3. A tube-grasping body according to claim 1, for grasping an insert tube in a heat exchanger, the tube-grasping body comprising:
   a configuration wherein,
      each of said tube-contacting parts (3f) capable of radially expanding or axially compressing, is bent to form a smooth curve with or without an edge on a bent portion, in a radial direction, from the prescribed location of each of said slits (3a) toward the opening (7b) of the tube (7), in order to gradually expand the width of each of said slits (3a) from the prescribed width (3u) to the expanded width (3x), from the prescribed location, toward the opening (7b) of the tube (7).

4. A tube-grasping body according to claim 1, for grasping an insert tube in a heat exchanger, the tube-grasping body comprising:
   a configuration wherein,
      a bump (3e) is formed to extrude from an interior surface of each of said tube-contacting parts (3f) at a side of the opening (7b), in an axial direction of the tube (7); and
      a second slope (3m), which has a straight or curved sloping side, is formed at said bump (3e), and slanted in the widening direction, from a summit (3p) of the bump (3e), toward the opening (7b) of the tube (7) facing an end-line (3o) of the tube-contacting part (3f), in order to prevent said opening (7b) from being deformed by collision of the bump (3e) with the opening (7b) of the tube (7) when the opening (7b) of the tube (7) is connected at its exterior to the tube-contacting parts (3f).

5. A tube-grasping body according to claim 1, for grasping an insert tube in a heat exchanger, the tube-grasping body comprising:
   a configuration wherein,
      a limiting means is installed at said tube-grasping body (3) having tube-contacting parts (3f) when said tube-grasping body (3) is held by a tube-grasping body holder (3l), in order to limit a location of a radial expansion or an axial compression of the tube-contacting parts (3f) of the tube-grasping body (3).

6. A tube-grasping body according to claim 2, for grasping an insert tube in a heat exchanger, the tube-grasping body comprising:
   a configuration wherein,
      a third slope (3g), which has a straight or curved sloping side, is formed on an interior circumference of said guide-pipe (3c) at its end side, and slanted in the widening direction toward the opening (7b) of the corresponding tube (7), in order to reduce a sliding abrasion against each of the first slopes (3b) formed on the exterior surface of each of said tube-contacting parts (3f); and
      said first slope (3b) is also formed, on the exterior surface of each of the tube-contacting parts (3f) of said tube-grasping body (3), at such a position that the first slope (3b) is not allowed to reach the end-line (3o) of each of said tube-contacting parts (3f).

* * * * *